(12) United States Patent
Takizawa et al.

(10) Patent No.: US 10,339,115 B2
(45) Date of Patent: Jul. 2, 2019

(54) METHOD FOR ASSOCIATING ITEM VALUES, NON-TRANSITORY COMPUTER-READABLE RECORDING MEDIUM AND INFORMATION PROCESSING DEVICE

(71) Applicant: FUJITSU LIMITED, Kawasaki-shi, Kanagawa (JP)

(72) Inventors: Ryou Takizawa, Fujisawa (JP); Teppei Nitta, Fujisawa (JP); Sachio Takeda, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 15/229,945

(22) Filed: Aug. 5, 2016

(65) Prior Publication Data

US 2017/0060909 A1   Mar. 2, 2017

(30) Foreign Application Priority Data

Aug. 18, 2015 (JP) ................................. 2015-160988

(51) Int. Cl.
*G06F 17/30* (2006.01)
*G06F 16/21* (2019.01)
(Continued)

(52) U.S. Cl.
CPC ............ *G06F 16/211* (2019.01); *G06F 16/22* (2019.01); *G06F 16/248* (2019.01); *G06F 16/258* (2019.01); *G06F 17/246* (2013.01)

(58) Field of Classification Search
CPC .. G06F 3/048–04897; G06F 17/30286–30731; G06F 17/30569
See application file for complete search history.

(56) References Cited

U.S. PATENT DOCUMENTS 6,154,748 A * 11/2000 Gupta ............... G06F 17/30569
7,644,357 B2    1/2010 Aoyama
(Continued)

FOREIGN PATENT DOCUMENTS

JP   2003-337725 A   11/2003
JP   2004-86782 A    3/2004
(Continued)

OTHER PUBLICATIONS

DataSpider, "searched on Aug. 6, 2015", Internet, <http://dataspider.appresso.com/>, (14 pages).
(Continued)

*Primary Examiner* — Keith D Bloomquist
(74) *Attorney, Agent, or Firm* — Westerman, Hattori, Daniels & Adrian, LLP

(57) ABSTRACT

An information processing device receives data that includes a plurality of items and an item value associated therewith, displays a matrix in which the items included in the data being received are arranged in either one of a row direction or a column direction, and one or more candidate items for an association destination with which a part or all of the items are associated, are arranged in the other direction; receives specification of a set of any item in the items and any item in the one or more candidate items for the association destination, by specification of a position on the matrix, using the processor; and stores a value of an item that is associated with the position having been specified among the items, in a storage unit, in association with an item that is associated with the position having been specified among the candidate items for the association destination.

15 Claims, 23 Drawing Sheets

(51) Int. Cl.
  *G06F 16/22*     (2019.01)
  *G06F 16/248*    (2019.01)
  *G06F 16/25*     (2019.01)
  *G06F 17/24*     (2006.01)

(56) References Cited

U.S. PATENT DOCUMENTS

| | | | | |
|---|---|---|---|---|
| 9,213,767 | B2* | 12/2015 | Scholz | G06F 17/3071 |
| 2010/0057673 | A1* | 3/2010 | Savov | G06F 17/30569 |
| | | | | 707/E17.002 |
| 2012/0016837 | A1 | 1/2012 | Matsuda et al. | |
| 2013/0110884 | A1* | 5/2013 | Eakins | G06F 17/2264 |
| | | | | 707/809 |
| 2017/0052984 | A1* | 2/2017 | Treiser | G06F 17/30297 |

FOREIGN PATENT DOCUMENTS

| | | |
|---|---|---|
| JP | 2004-185520 A | 7/2004 |
| JP | 2006-276931 A | 10/2006 |
| JP | 2007-183823 A | 7/2007 |
| JP | 2011-258122 A | 12/2011 |
| WO | 2010/113290 A1 | 10/2010 |

OTHER PUBLICATIONS

Asteria warp, "searched on Aug. 6, 2015", Internet <http://asteria.jp/documentation/warp/4.3/flow/designer/index_guide.html>, (2 pages).
Office Action dated May 14, 2019, issued in counterpart JP Application No. 2015-160988, with English translation. (5 pages).

* cited by examiner

FIG.3

FILE TABLE (141)

141A:

| STUDENT IDENTIFICATION NUMBER | NAME | AFFILIATION 1 | AFFILIATION 2 | AFFILIATION 3 |
|---|---|---|---|---|
| 1234 | RYO TAKIZAWA | ABC | XXX | abc |
| 2345 | TEPPEI NITTA | ABC | YYY | def |
| 3456 | YUKIO TAKEDA | DEF | ZZZ | ghi |

141B:

| STUDENT IDENTIFICATION NUMBER | HIGH SCHOOL CODE | HIGH SCHOOL NAME | DATE AND YEAR OF BIRTH |
|---|---|---|---|
| 3456 | KKK |  | 2000/2/2 |
| 1234 | XXX |  | 1980/1/1 |
| 9876 | AAA | FUJITSU HIGH SCHOOL | 1990/3/3 |
| 8765 | ZZZ |  |  |
|  |  |  |  |

141C:

| STUDENT IDENTIFICATION NUMBER | NAME 1 | NAME 2 | NAME 3 |
|---|---|---|---|
| 3456 | TAKEDA |  | YUKIO |
| 8765 | MICHAEL | E | FOX |
|  |  |  |  |

141D:

| HIGH SCHOOL CODE | HIGH SCHOOL NAME |
|---|---|
| AAA | SHIODOME HIGH SCHOOL |
| BBB | ATHENS HIGH SCHOOL |
| KKK | KAMATA HIGH SCHOOL |
| XXX | KAWASAKI HIGH SCHOOL |
| YYY | FUJITSU HIGH SCHOOL |

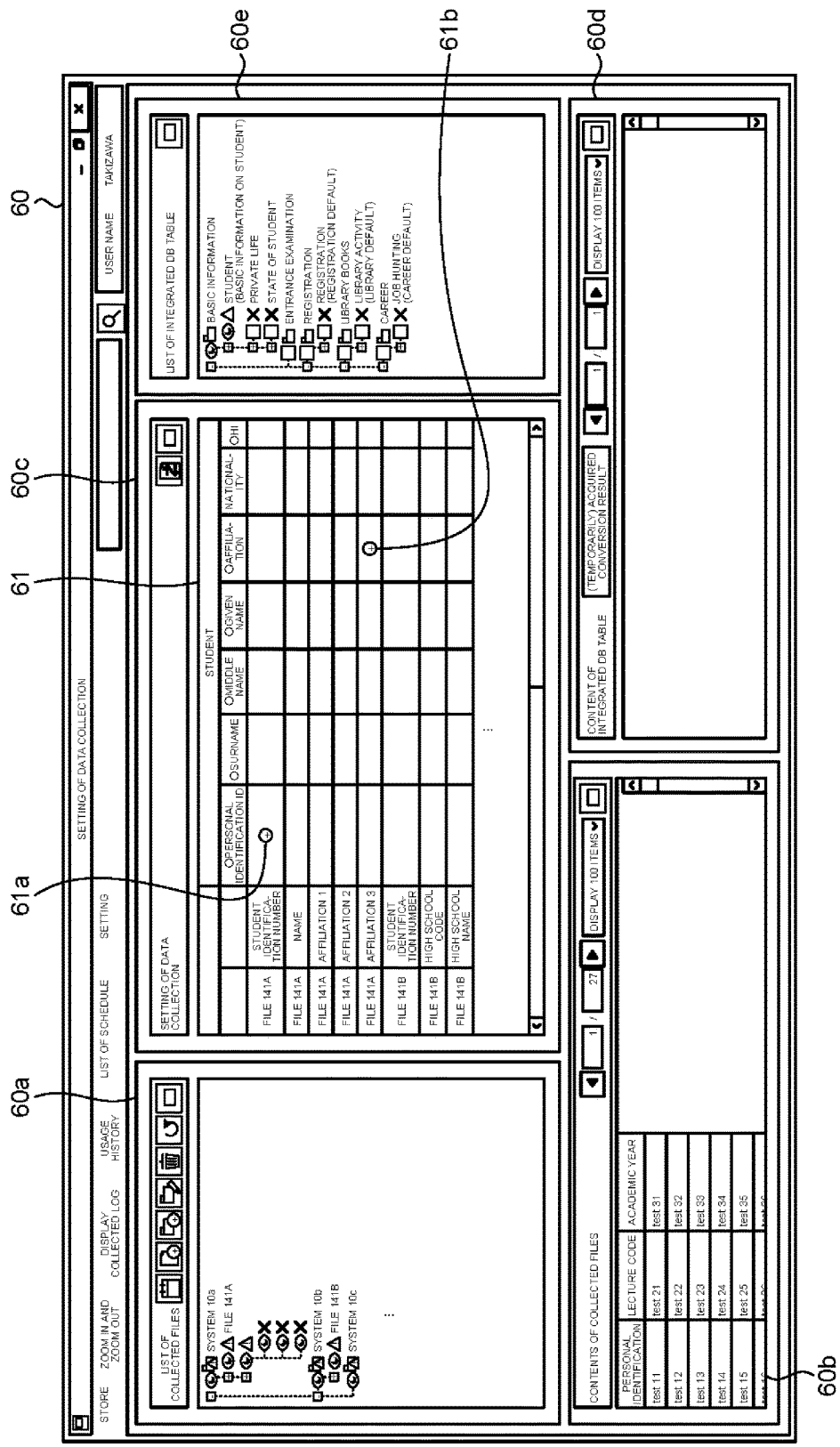

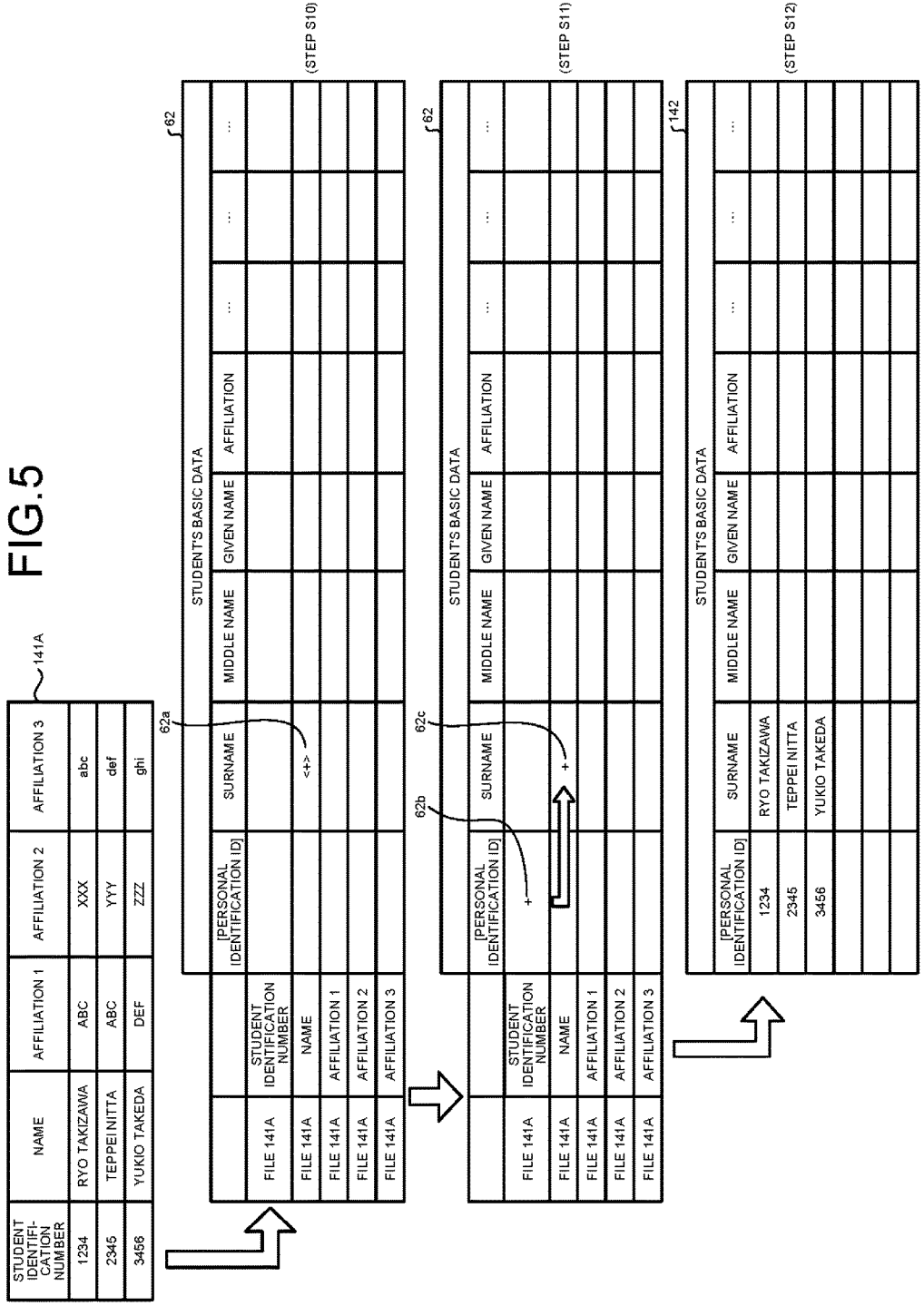

| STUDENT IDENTIFICATION NUMBER | NAME | AFFILIATION 1 | AFFILIATION 2 | AFFILIATION 3 |
|---|---|---|---|---|
| 5 | 5 | 9 | 5 | 5 |
| 1234 | RYO TAKIZAWA | ABC | XXX | abc |
| 2345 | TEPPEI NITTA | ABC | YYY | def |
| 3456 | YUKIO TAKEDA | DEF | ZZZ | ghi |

141B

| STUDENT IDENTIFICATION NUMBER | HIGH SCHOOL CODE | HIGH SCHOOL NAME | DATE AND YEAR OF BIRTH |
|---|---|---|---|
| 5 | 5 | 5 | 5 |
| 3456 | KKK | | 2000/2/2 |
| 1234 | XXX | | 1980/1/1 |
| 9876 | AAA | FUJITSU HIGH SCHOOL | 1990/3/3 |
| 8765 | ZZZ | | |
| | | | |

141C

| STUDENT IDENTIFICATION NUMBER | NAME 1 | NAME 2 | NAME 3 |
|---|---|---|---|
| 5 | 10 | 5 | 5 |
| 3456 | TAKEDA | | YUKIO |
| 8765 | MICHAEL | E | FOX |
| | | | |

FIG.15

| INPUT | [AFFILIATION 1] | [AFFILIATION 2] | [AFFILIATION 3] | | | | 66A |
|---|---|---|---|---|---|---|---|
| CONVERSION 1 | CONNECT [AFFILIATION 2] SUBSEQUENT TO [AFFILIATION 1] TO OBTAIN [RESULT OF CONVERSION 1] ||||||
| CONVERSION 2 | CONNECT [AFFILIATION 3] SUBSEQUENT TO [RESULT OF CONVERSION 1] TO OBTAIN [RESULT OF CONVERSION 2] ||||||
| OUTPUT | [RESULT OF CONVERSION 2] ||||||

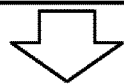

| INPUT | [AFFILIATION 1] | [AFFILIATION 2] | [AFFILIATION 3] | | | | 68A |
|---|---|---|---|---|---|---|---|
| CONVERSION 1 | CONNECT [AFFILIATION 2] SUBSEQUENT TO [AFFILIATION 1] TO OBTAIN [RESULT OF CONVERSION 1] ||||||
| CONVERSION 2 | CONNECT [AFFILIATION 3] SUBSEQUENT TO [RESULT OF CONVERSION 1] TO OBTAIN [RESULT OF CONVERSION 2] ||||||
| CONVERSION 3 | CONVERT [RESULT OF CONVERSION 2] USING CORRESPONDENCE TABLE TO OBTAIN [RESULT OF CONVERSION 3] ||||||
| OUTPUT | [RESULT OF CONVERSION 3] ||||||

FIG.16

| INPUT | [AFFILIATION 1] | [AFFILIATION 2] | [AFFILIATION 3] | | | | 66A |
|---|---|---|---|---|---|---|---|
| CONVERSION 1 | CONNECT [AFFILIATION 2] SUBSEQUENT TO [AFFILIATION 1] TO OBTAIN [RESULT OF CONVERSION 1] ||||||
| CONVERSION 2 | CONNECT [AFFILIATION 3] SUBSEQUENT TO [RESULT OF CONVERSION 1] TO OBTAIN [RESULT OF CONVERSION 2] ||||||
| OUTPUT | [RESULT OF CONVERSION 2] ||||||

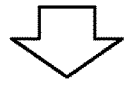

| INPUT | [AFFILIATION 1] | [AFFILIATION 2] | [AFFILIATION 3] | | | | 68B |
|---|---|---|---|---|---|---|---|
| CONVERSION 1 | CONNECT [AFFILIATION 2] SUBSEQUENT TO [AFFILIATION 1] TO OBTAIN [RESULT OF CONVERSION 1] ||||||
| CONVERSION 2 | CHANGE [RESULT OF CONVERSION 1] TO DOUBLE-BYTE CHARACTERS TO OBTAIN [RESULT OF CONVERSION 2] ||||||
| OUTPUT | [RESULT OF CONVERSION 2] ||||||

METHOD FOR ASSOCIATING ITEM VALUES, NON-TRANSITORY COMPUTER-READABLE RECORDING MEDIUM AND INFORMATION PROCESSING DEVICE

CROSS-REFERENCE TO RELATED APPLICATION(S)

This application is based upon and claims the benefit of priority of the prior Japanese Patent Application No. 2015-160988, filed on Aug. 18, 2015, the entire contents of which are incorporated herein by reference.

FIELD

The embodiment discussed herein is related to a method for associating item values, a non-transitory computer-readable recording medium, and an information processing device.

BACKGROUND

For example, in facilities such as universities, systems that individually manage various types of information on the students are scattered around. The examples are a management system for managing basic information and the like on the students, a lesson support system for managing information on reports and assignments, a library system for managing information on the history of reserving, lending, and returning books, and the like.

As described above, when a plurality of systems are managing the information on the students individually, it is not possible to collectively refer to the information on the students, and thus it is inconvenient. Consequently, creation of an integrated database in which information in the systems is integrated has been desired.

For example, there is a conventional technique that easily creates an integrated database, by supporting a setting operation for associating an item value of a to-be-integrated item that is present in the information on the system, with an item value of a candidate item of the integrated database.

[Non Patent Literature 1] asteria warp, "searched on Aug. 6, 2015", Internet <http://asteria.jp/documentation/warp/4.3/flow/designer/index_guide.html>

[Non Patent Literature 2] DataSpider, "searched on Aug. 6, 2015", Internet <http://dataspider.appresso.com/>

SUMMARY

A method for associating item values includes receiving data that includes a plurality of items and an item value associated therewith; displaying a matrix in which the items included in the data being received are arranged in either one of a row direction or a column direction, and one or more candidate items for an association destination with which a part or all of the items are associated, are arranged in the other direction; receiving specification of a set of any item in the items and any item in the one or more candidate items for the association destination, by specification of a position on the matrix; and storing a value of an item that is associated with the position having been specified among the items, in a storage unit, in association with an item that is associated with the position having been specified among the candidate items for the association destination.

An object and advantages of the present invention will be achieved and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of a file table;

FIG. 4 is a diagram illustrating an example of a display screen generated by a display control unit;

FIG. 5 is a diagram for explaining a process performed by the display control unit based on a rule 1;

FIG. 8 is a diagram 1 for explaining a process performed by the display control unit based on a rule 4;

FIG. 15 is a diagram 1 for explaining a process performed by the display control unit based on a rule 7;

FIG. 16 is a diagram 2 for explaining the process performed by the display control unit based on the rule 7;

DESCRIPTION OF EMBODIMENT

However, in the conventional technique described above, there is a problem in that it is difficult to associate an item value of an item to be integrated with an item value of a candidate item for an association destination. For example, in the conventional technique described above, the integrated database is created under an assumption that an expert with special knowledge uses the database. Thus, special knowledge is needed to decipher information to be displayed on a display screen, and it is difficult for a general user to create an integrated database by using the conventional technique. The problem described above occurs not only in the facilities such as universities, but also occurs when information in the systems that individually manage user information is integrated to create the integrated database.

Preferred embodiments of a method for associating item values, a non-transitory computer-readable recording medium, and an information processing device of the present invention will be explained in detail with reference to the accompanying drawings. It is to be noted that the invention is not limited to the embodiment.

Figure 1:
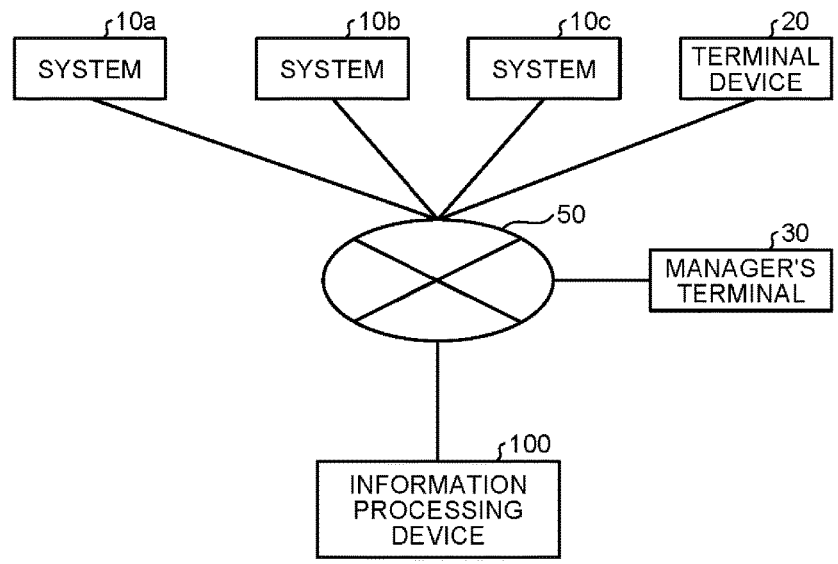
FIG. 1 is a diagram illustrating a configuration of a system according to the present embodiment.

FIG. 1 is a diagram illustrating a configuration of a system according to the present embodiment. As illustrated in FIG. 1, the system includes systems 10a, 10b, 10c, a terminal device 20, a manager's terminal 30, and an information processing device 100. In the following explanation, the systems 10a to 10c are collectively referred to as a system 10 in a suitable manner. The system 10, the terminal device 20, the manager's terminal 30, and the information processing device 100 are connected with each other via a network 50.

The system 10 manages various types of information regarding a user. For example, upon receiving various types of information regarding the user, the system 10 stores therein the received information as a file. The system 10 also executes processes corresponding to various requests such as inspecting, updating, and deleting the file, from another terminal device, which is not illustrated. The system 10 responds to the request from the information processing device 100 and transmits the file to the information processing device 100.

The terminal device 20 is a terminal device used by a user. For example, upon receiving various types of information regarding the user, the terminal device 20 stores therein the received information as a file. The terminal device 20 responds to a request from the information processing device 100, and transmits the file to the information processing device 100.

The manager's terminal 30 is a terminal device used by a manager of an integrated database. By operating the manager's terminal 30, the manager integrates a plurality of files, and notifies the information processing device 100 of conditions for creating an integrated database.

Figure 2:
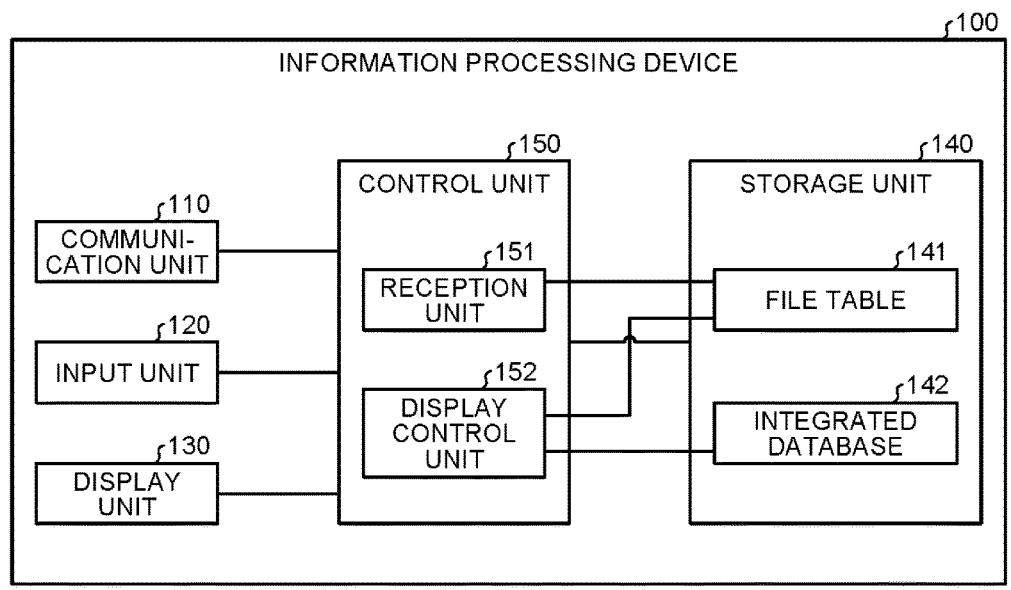
FIG. 2 is a functional block diagram illustrating a configuration of an information processing device according to the present embodiment.

The information processing device 100 is a device that creates an integrated database, by acquiring files from the systems 10, and integrating the files. FIG. 2 is a functional block diagram illustrating a configuration of the information processing device according to the present embodiment. As illustrated in FIG. 2, the information processing device 100 includes a communication unit 110, an input unit 120, a display unit 130, a storage unit 140, and a control unit 150.

The communication unit 110 is a processing unit that executes data communication with the system 10, the terminal device 20, and the manager's terminal 30 via the network 50. The communication unit 110 corresponds to a communication device. The control unit 150, which will be described below, will exchange data with the system 10, the terminal device 20, and the manager's terminal 30, via the communication unit 110.

The input unit 120 is an input device that enters various types of information into the information processing device 100. For example, the input unit 120 corresponds to a keyboard, a mouse, a touch panel, and the like.

The display unit 130 is a display device that displays various types of information that are output from the control unit 150. For example, the display unit 130 corresponds to a liquid crystal display, a touch panel, and the like.

The storage unit 140 includes a file table 141 and an integrated database 142. For example, the storage unit 140 corresponds to a semiconductor memory device such as a random access memory (RAM), a read only memory (ROM), and a flash memory, or a storage device such as a hard disk drive (HDD).

The file table 141 is a table that stores files acquired from the systems 10 and the terminal device 20. FIG. 3 is a diagram illustrating an example of a data structure of the file table. As illustrated in FIG. 3, the file table 141 includes a file 141A, a file 141B, a file 141C, and a file 141D. Each of the files 141A to 141D has a plurality of items, and an item value associated with each of the items.

The file 141A in FIG. 3 will now be described. The file 141A has items "student identification number", "name", "affiliation 1", "affiliation 2", and "affiliation 3". An item value is associated with each of the items. The record in the first row will be explained as an example. The item value of the item "student identification number" is "1234", the item value of the item "name" is "Ryo Takizawa", the item value of the item "affiliation 1" is "ABC", the item value of the item "affiliation 2" is "XXX", and the item value of the item "affiliation 3" is "abc".

As illustrated in FIG. 3, similar to the file 141A, the files 141B to 141D also have items, and an item value associated with each of the items, but the description thereof will be omitted. In the example illustrated in FIG. 3, the files 141A to 141D are illustrated. However, the file table 141 may also include other files.

Referring back to FIG. 2, the integrated database 142 is data obtained by integrating the files that are stored in the file table 141.

The control unit 150 includes a reception unit 151 and a display control unit 152. The control unit 150 corresponds to an accumulation device such as an application specific integrated circuit (ASIC) and a field programmable gate array (FPGA). For example, the control unit 150 corresponds to an electronic circuit such as a central processing unit (CPU) and a micro processing unit (MPU).

The reception unit 151 is a processing unit that requests a file to each of the systems 10 and the terminal device 20, and receives the requested file. The reception unit 151 stores the files acquired from the systems 10 and the terminal device 20, in the file table 141.

The display control unit 152 generates a display screen based on the files 141A to 141D that are stored in the file table 141, and notifies the manager's terminal 30 of information on the display screen. The display control unit 152 integrates the files 141A to 141D based on the instruction from the manager's terminal 30 using the display screen, and generates the integrated database 142.

FIG. 4 is a diagram illustrating an example of the display screen generated by the display control unit. For example, a display screen 60 includes display areas 60a, 60b, 60c, 60d, and 60e. The display area 60a is an area for displaying information on the files that are stored in the file table 141. For example, the display control unit 152 displays information for identifying each of the files based on the file table 141, on the display area 60a.

The display area 60b is an area for displaying the content of the file. For example, when a manager who operates the manager's terminal 30 selects a file in the display area 60a, the display control unit 152 displays the content of data of the selected file, on the display area 60b.

The display area 60c is an area for displaying a matrix 61 in which the items included in the files are arranged in a column direction, and candidate items of the integrated database 142 are arranged in a row direction. The display control unit 152 refers to the file table 141, and arranges the items of the files 141a to 141D in the column direction of the matrix 61. The display control unit 152 arranges the candidate items of the integrated database 142 that are set in advance, in the row direction of the matrix 61. The display control unit 152 may also arrange the items included in the files in the row direction, and arrange the candidate items of the integrated database 142 in the column direction.

The manager who operates the manager's terminal 30 refers to the matrix 61 that is displayed on the display screen 60, and specifies the position of the item to be associated and the candidate item, using a map. The display control unit 152 specifies a set of the item of the file and the candidate item of the integrated database 142, based on the position of the specified map, and stores the item value of the item of the file, in the item of integrated database 142.

For example, in the example illustrated in FIG. 4 maps 61a and 61b are specified. The item "student identification number" of the file 141A is associated with the candidate item "personal identification ID", by the map 61a. The "affiliation 3" of the file 141A is associated with the candidate item "affiliation", by the map 61b.

The display area 60d is an area for displaying the content of data of the integrated database 142 that is generated by the association specified in the matrix 61. The display control unit 152 generates the integrated database 142, by storing the item value of the item of each file, in each item of the integrated database 142, based on the position of the map that is specified in the matrix 61. The display control unit 152 then displays the content of data of the integrated database 142, on the display area 60d.

The display area 60e is an area for displaying information on the integrated database 142 that has been generated in the past. For example, every time the integrated database 142 is generated based on the position of the map that is set on the matrix 61, the display control unit 152 stores the integrated databases 142 in the storage unit 140, while making the integrated databases 142 identifiable. The display control unit 152 then displays the information on each of the integrated databases 142 on the display area 60e. When the manager who operates the manager's terminal 30 selects the integrated database 142 in the display area 60e, the display control unit 152 may display the content of data in the selected integrated database 142, on the display area 60d.

Next, the process performed by the display control unit 152 will be described in detail. For example, the display control unit 152 generates the integrated database 142 based on rules 1 to 10, which will be described below.

FIG. 5 is a diagram for explaining a process performed by the display control unit based on the rule 1. The rule 1 is a rule in which, a map for the key item at the integrated database 142 side is received, a map for another item is received. In FIG. 5, the file 141A is used for the explanation. The items of the file 141A include student identification number, name, affiliation 1, affiliation 2, and affiliation 3. The candidate items of the integrated database 142 include personal identification ID, surname, middle name, given name, and affiliation. The key item of the integrated database 142 is the "personal identification ID".

The display control unit 152 generates a matrix 62 in which the items of the file 141A are arranged in the column direction, and the candidate items of the integrated database 142 are arranged in the row direction. When the manager who operates the manager's terminal 30 receives a map 62a before receiving the map for the key item "personal identification ID", the display control unit 152 deletes the map 62a (step S10).

When the manager specifies a map 62c after specifying a map 62b for the key item "personal identification ID", the display control unit 152 receives the specification of the maps 62b and 62c. The display control unit 152 associates the item of the file 141A with the candidate item of the integrated database 142, based on the maps 62b and 62c (step S11).

The display control unit 152 associates the item "student identification number" of the file 141A with the candidate item "personal identification ID" of the integrated database 142, based on the map 62b. Based on the association, the display control unit 152 stores the item values "1234, 2345, 3456" of the item "student identification number" of the file 141A, in the item values of the item "personal identification ID" of the integrated database 142 (step S12).

The display control unit 152 associates the item "name" of the file 141A with the candidate item "surname" of the integrated database 142, based on the map 62c. Based on the association, the display control unit 152 stores the item values "Ryo Takizawa, Teppei Nitta, and Yukio Takeda" of the item "name" of the file 141A, in the item values of the item "surname" of the integrated database 142 (step S12).

Figure 6:
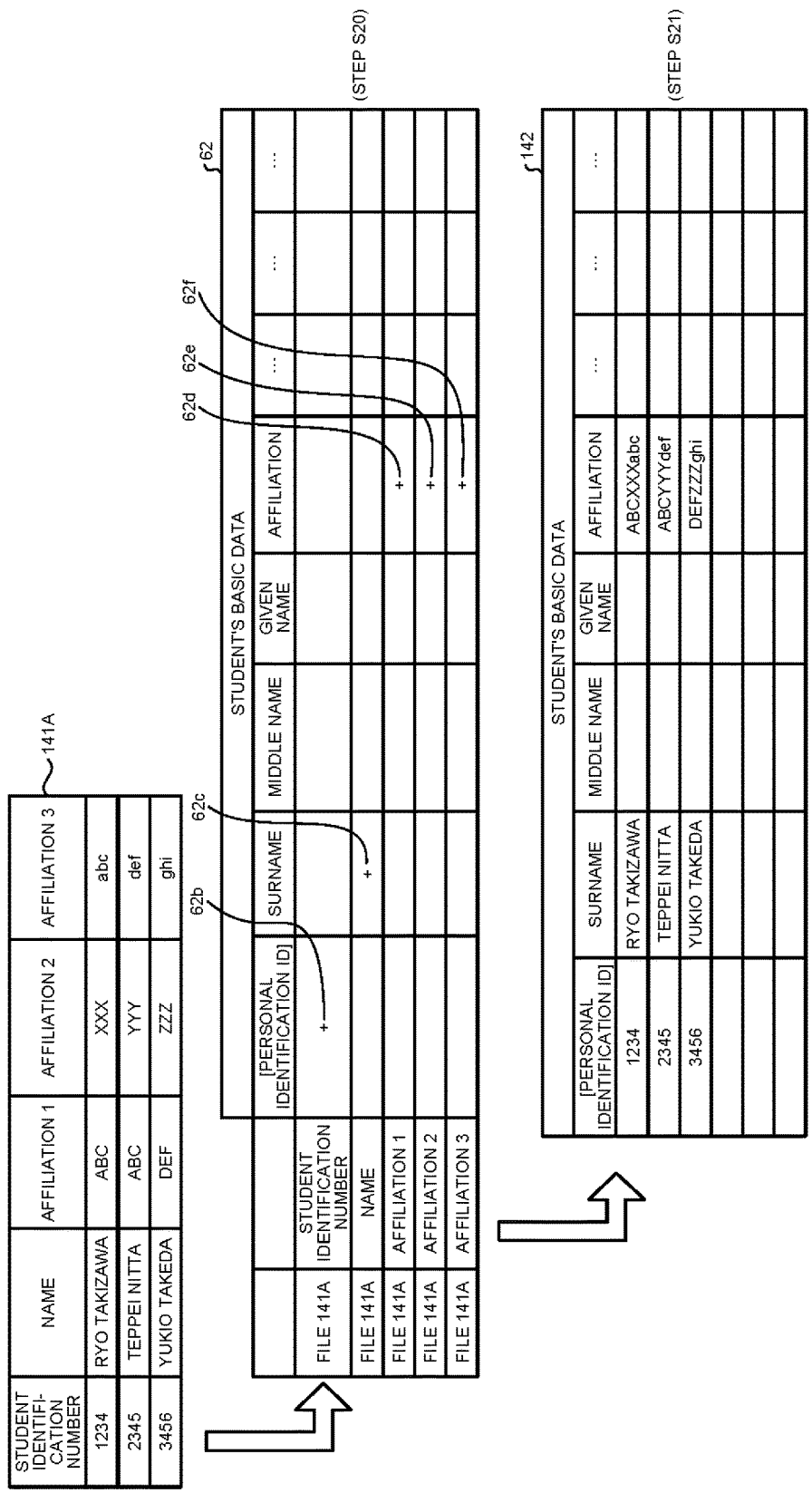
FIG. 6 is a diagram for explaining a process performed by the display control unit based on a rule 2.

FIG. 6 is a diagram for explaining a process performed by the display control unit based on the rule 2. The rule 2 is a rule in which when the map is specified in the items of the same file, the item values of the specified items are simply connected, and is transferred to the item value associated with the integrated database 142. In FIG. 6, the file 141A is used for the explanation. The explanation on the file 141A and the explanation on the matrix 62 are the same as those in FIG. 5.

When the manager who operates the manager's terminal 30 specifies the maps 62c to 62f, after specifying the map 62b for the key item "personal identification ID", the display control unit 152 receives the specification of the maps 62b to 62f. The display control unit 152 associates the item of the file 141A with the item of the integrated database 142, based on the maps 62b to 62f (step S20).

Because the process that the display control unit 152 stores the item value of the item of the file 141A in the item value of the item of the integrated database 142, based on the maps 62b and 62c is the same as that in FIG. 5, the description thereof will be omitted.

The display control unit 152 associates the items "affiliation 1, affiliation 2, and affiliation 3" of the file 141A with the candidate item "affiliation" of the integrated database 142, based on the maps 62d to 62f. Based on the association, the display control unit 152 generates item values "ABCXXXabc, ABCYYYdef, DEFZZZghi" that are obtained by simply connecting the item values of the items in the file 141A. The item value "ABCXXXabc" is obtained by simply connecting the item values of the first row of the items "affiliation 1, affiliation 2, and affiliation 3" of the file 141A. The item value "ABCYYYdef" is obtained by simply connecting the item values of the second row of the items "affiliation 1, affiliation 2, and affiliation 3" of the file 141A. The item value "DEFZZZghi" is obtained by simply connecting the item values of the third row of the items "affiliation 1, affiliation 2, and affiliation 3" of the file 141A. The display control unit 152 stores the simply connected item values, in the item values of the "affiliation" of the integrated database 142 (step 21).

Although the illustration is omitted, an item value of a single item in the file may be associated with a plurality of the candidate items of the integrated database 142. For example, there may be a case when a plurality of maps are specified in the row that is associated with the item "student identification number" of the file 141A, on the matrix 62 of the display control unit 152. For example, there may be a case when another map is specified in the column next to the map 62b, in addition to the map 62b. In this case, the display control unit 152 stores the item value of the item "student identification number" of the file 141A, in the item values of the items "personal identification ID" and the "surname" of the integrated database 142.

Figure 7:
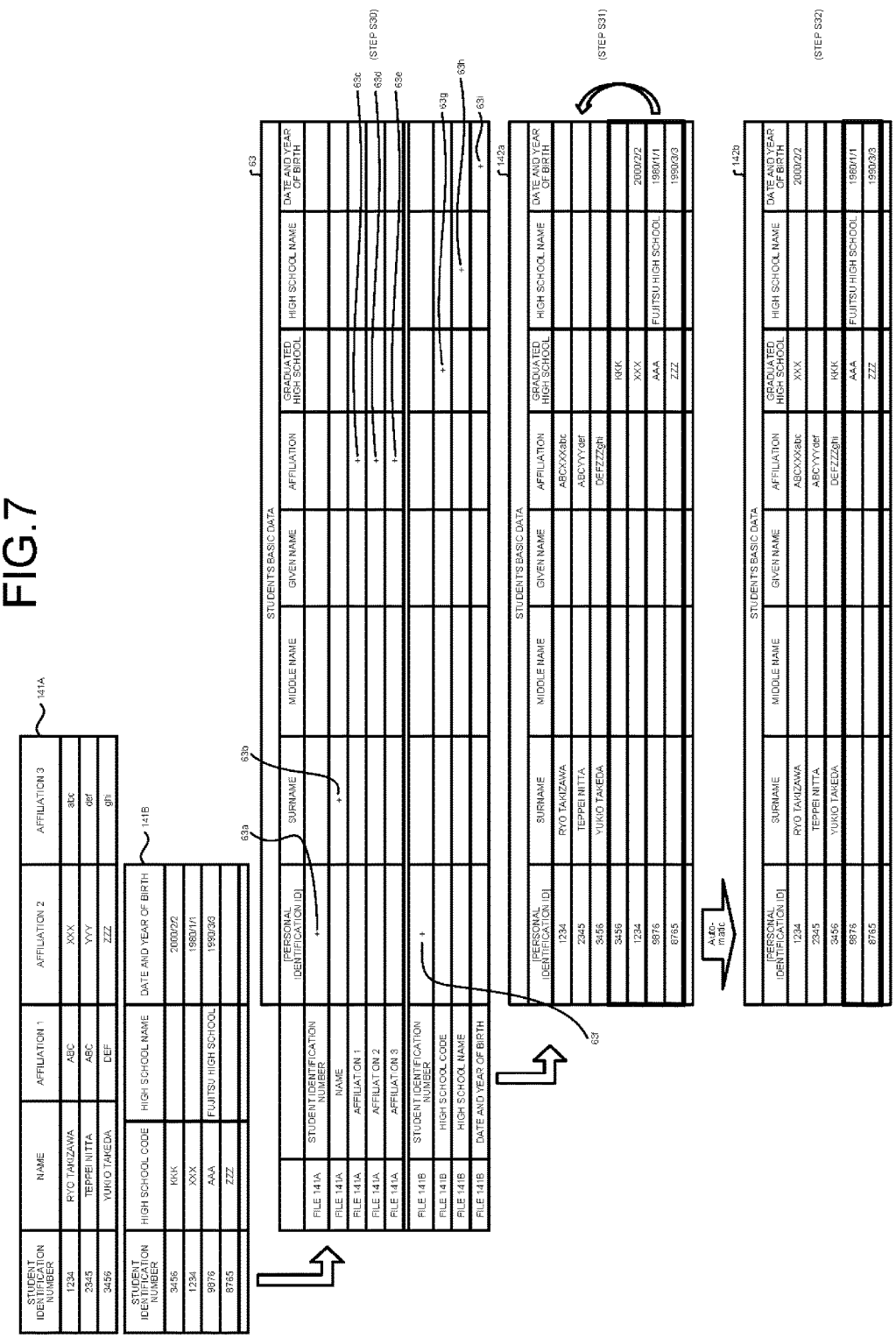
FIG. 7 is a diagram for explaining a process performed by the display control unit based on a rule 3.

The FIG. 7 is a diagram for explaining a process performed by the display control unit based on the rule 3. The rule 3 is a rule in which when maps are specified in the key item of the integrated database 142 over the files, the item values are integrated instead of simply connecting the item values. In FIG. 7, the files 141A and 141B are used for the explanation. The explanation on the file 141A is the same as that in FIG. 5. The items of the file 141B include student identification number, high school code, high school name, and date and year of birth.

The display control unit 152 generates a matrix 63 in which the items of the files 141A and 141B are arranged in the column direction, and the candidate items of the integrated database 142 are arranged in the row direction. The candidate items of the integrated database 142 include personal identification ID, surname, middle name, given name, affiliation, graduated high school, high school name, and date of birth.

When the manager who operates the manager's terminal 30 specifies maps 63b to 63e, after specifying a map 63a for the key item "personal identification ID", the display control unit 152 receives the specification of the maps 63a to 63e. When the manager specifies maps 63g to 63i after specifying a map 63f for the key item "personal identification ID", the display control unit 152 receives the specification of the maps 63f to 63i (step S30).

Based on the map 63a, the display control unit 152 associates the item "student identification number" of the file 141A with the candidate item "personal identification ID" of the integrated database 142. Based on the association, the display control unit 152 stores the item values "1234, 2345, and 3456" of the item "student identification number" of the file 141A, in the item values of the item "personal identification ID" of an integrated database 142a.

Based on the map 63b, the display control unit 152 associates the item "name" of the file 141A with the candidate item "surname" of the integrated database 142. Based on the association, the display control unit 152 stores the item values "Ryo Takizawa, Teppei Nitta, and Yukio Takeda" of the item "name" of the file 141A, in the item values of the item "surname" of the integrated database 142a.

Based on the maps 63c to 63e, the display control unit 152 associates the items "affiliation 1, affiliation 2, and affiliation 3" of the file 141A with the candidate item "affiliation" of the integrated database 142a. Based on the association, the display control unit 152 generates the item values "ABCXXXabc, ABCYYYdef, and DEFZZZghi" that are obtained by simply connecting the item values of the items in the file 141A. The display control unit 152 stores the simply connected item values in the item values of the "affiliation" of the integrated database 142a.

Based on the map 63f, the display control unit 152 associates the item "student identification number" of the file 141B with the candidate item "personal identification ID" of the integrated database 142. Based on the association, the display control unit 152 stores the item values "3456, 1234, 9876, and 8765" of the item "student identification number" of the file 141B, in the item values of the item "personal identification ID" of the integrated database 142a.

Based on the map 63g, the display control unit 152 associates the item "high school code" of the file 141B with the candidate item "graduated high school" of the integrated database 142. Based on the association, the display control unit 152 stores the item values "KKK, XXX, AAA, and ZZZ" of the item "high school code" of the file 141B, in the item values of the item "graduated high school" of the integrated database 142a.

Based on the map 63h, the display control unit 152 associates the item "high school name" of the file 141B with the candidate item "high school name" of the integrated database 142. Based on the association, the display control unit 152 stores the item value "Fujitsu High School" of the item "high school name" of the file 141B, in the item value of the item "high school name" of the integrated database 142a.

Based on the map 63i, the display control unit 152 associates the item "date and year of birth" of the file 141B with the candidate item "date of birth" of the integrated database 142. Based on the association, the display control unit 152 stores the item values "2000/2/2, 1980/1/1, 1990/3/3" of the item "date and year of birth" of the file 141B, in the item values of the item "date of birth" of the integrated database 142a (step S31).

By comparing the key item "personal identification IDs" of the integrated database 142a, and if there are a plurality of the same personal identification IDs, the display control unit 152 integrates the records of the same personal identification IDs. For example, the personal identification IDs of the first row and the fifth row of the integrated database 142a are both "1234" and are the same. Thus, the display control unit 152 integrates the records, and generates the record of the first row in an integrated database 142b. Also, the personal identification IDs of the third row and the fourth row of the integrated database 142a are both "3456" and are the same. Thus, the display control unit 152 integrates the records, and generates the record of the third row in the integrated database 142b.

When the display control unit 152 executes the above processes, the integrated database 142b is generated in the end (step S32).

Figure 9:
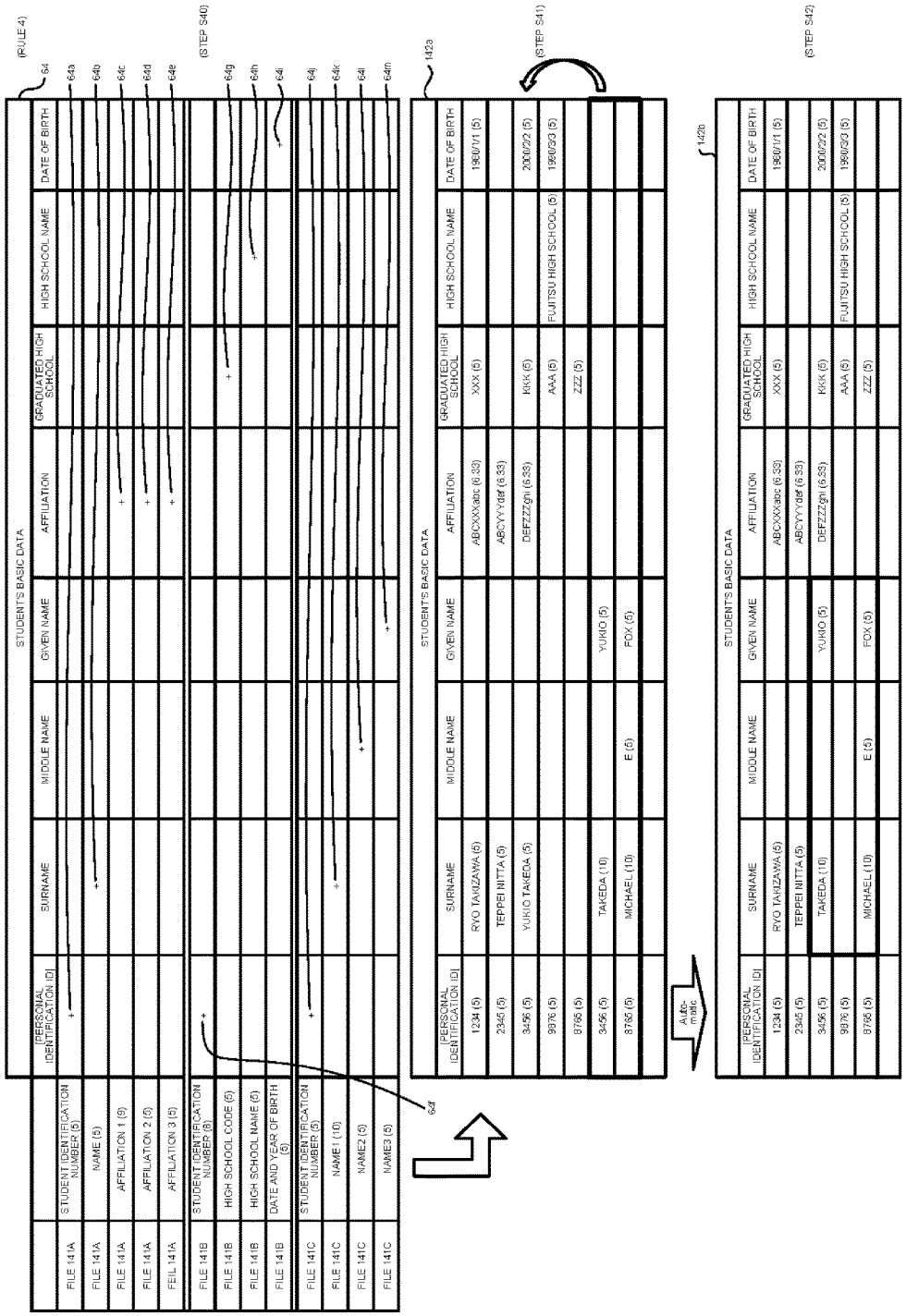
FIG. 9 is a diagram 2 for explaining the process performed by the display control unit based on the rule 4.

FIG. 8 and FIG. 9 are diagrams for explaining a process performed by the display control unit based on the rule 4. The rule 4 is a rule in which when the item values are set in the same item, while integrating the item values as in the rule 3, the item value with a lower priority is overwritten by the item value with a higher priority.

For example, as illustrated in FIG. 8, it is assumed that priority is set in advance for each of the items in the files 141A, 141B, and 141C. The priority is set in ten stages from one to ten, and the initial value of the priority is five. The priority increases with an increase in the numerical value. For example, the manager of the system 10 or the user who operates the terminal device 20 sets the priority information as appropriate, before transmitting the files 141A to 141C to the information processing device 100.

For example, it is assumed that the priority of the items "student identification number, name, affiliation 1, affiliation 2, and affiliation 3" of the file 141A is "5, 5, 9, 5, and 5", respectively. It is also assumed that the priority of the items "student identification number, high school code, high school name, and date and year of birth" of the file 141B is "5, 5, 5, and 5", respectively. It is further assumed that the priority of the items "student priority number, name 1, name 2, and name 3" of the file 141C is "5, 10, 5, and 5", respectively.

As illustrated in FIG. 9, the display control unit 152 generates a matrix 64 in which the items of the files 141A to 141C are arranged in the column direction, and the candidate items of the integrated database 142 are arranged in the row direction. The candidate items of the integrated database 142 include personal identification ID, surname, middle name, given name, affiliation, graduated high school, high school name, and date of birth. The value in the brackets denoted to each of the items of the matrix 64 in the column direction indicates the priority.

When the manager who operates the manager's terminal 30 specifies maps 64b to 64e, after specifying a map 64a for the key item "personal identification ID", the display control unit 152 receives the specification of the maps 64a to 64e. When the manager specifies maps 64g to 64i after specifying a map 64f for the key item "personal identification ID", the display control unit 152 receives the specification of the maps 64f to 64i. When the manager who operates the manager's terminal 30 specifies maps 64k to 64m after specifying a map 64j for the key item "personal identification ID", the display control unit 152 receives the specification of the maps 64j to 64m (step S40).

Based on the map 64a, the display control unit 152 associates the item "student identification number" of the file 141A with the candidate item "personal identification ID" of the integrated database 142. Based on the association, the display control unit 152 stores the item values "1234, 2345, and 3456" of the item "student identification number" of the file 141A, in the item values of the item "personal identification ID" of the integrated database 142a. Also, the display control unit 152 sets the priority associated with each item, in each item value. Since the priority of the item "student identification number" of the file 141A is "5", the display control unit 152 sets the priority of the item values "1234, 2345, and 3456" to "5, 5, and 5", respectively.

Based on the map 64b, the display control unit 152 associates the item "name" of the file 141A with the candidate item "surname" of the integrated database 142. Based on the association, the display control unit 152 stores the item values "Ryo Takizawa, Teppei Nitta, and Yukio Takeda" of the item "name" of the file 141A, in the item values of the item "surname" of the integrated database 142a. The display control unit 152 also sets the priority associated with each item, in each item value. Since the priority of the item "name" of the file 141A is "5", the display control unit 152 sets the priority of the item values "Ryo Takizawa, Teppei Nitta, and Yukio Takeda" to "5, 5, and 5", respectively.

Based on the maps 64c to 64e, the display control unit 152 associates the items "affiliation 1, affiliation 2, and affiliation 3" of the file 141A with the candidate item "affiliation" of the integrated database 142a. Based on the association, the display control unit 152 generates the item values "ABCXXXabc, ABCYYYdef, and DEFZZZghi" that are obtained by simply connecting the item values of the items of the file 141A. The display control unit 152 then stores the simply connected item values in the item values of the "affiliation" of the integrated database 142a. The display control unit 152 sets the priority of the connected "affiliation 1, affiliation 2, and affiliation 3" to "9, 5, and 5", respectively. The average value of the priority is "6.33". Consequently, the display control unit 152 sets the priority of the item values "ABCXXXabc, ABCYYYdef, and DEFZZZghi" that are obtained by simply connecting the item values, to "6.33, 6.33, and 6.33", respectively.

The display control unit 152 also performs association described in the rule 3, based on the maps 64f to 64i, sets the priority of each of the item values, and integrates the values. Thus, the records from the first row to the fifth row of the integrated database 142a are generated. The records from the first row to the fifth row of the integrated database 142a illustrated in FIG. 9 become the same as those in the integrated database 142b illustrated in FIG. 7, except that the priority is set.

Based on the map 64j, the display control unit 152 associates the item "student identification number" of the file 141C with the candidate item "personal identification ID" of the integrated database 142. Based on the association, the display control unit 152 stores the item values "3456 and 8765" of the item "student identification number" of the file 141C, in the item values of the item "personal identification ID" of the integrated database 142a. The display control unit 152 also sets the priority associated with each item, in each item value. Since the priority of the item "student identification number" of the file 141C is "5", the display control unit 152 sets the priority of the item values "3456 and 8765" to "5 and 5", respectively.

Based on the map 64k, the display control unit 152 associates the item "name 1" of the file 141C with the candidate item "surname" of the integrated database 142. Based on the association, the display control unit 152 stores the item values "Takeda and Michael" of the item "name 1" of the file 141C, in the item values of the item "surname" of the integrated database 142a. The display control unit 152 also sets the priority associated with each item, in each item value. Since the priority of the item "name 1" of the file 141C is "10", the display control unit 152 sets the priority of the item values "Takeda and Michael" to "10 and 10", respectively.

Based on the map 64l, the display control unit 152 associates the item "name 2" of the file 141C with the candidate item "middle name" of the integrated database 142. Based on the association, the display control unit 152 stores the item value "E" of the item "name 2" of the file 141C, in the item value of the item "middle name" of the integrated database 142a. The display control unit 152 also sets the priority associated with each item, in each item value. Since the priority of the item "name 2" of the file 141C is "5", the display control unit 152 sets the priority of the item value "E" to "5".

Based on the map 64m, the display control unit 152 associates the item "name 3" of the file 141C with the candidate item "given name" of the integrated database 142. Based on the association, the display control unit 152 stores the item values "Yukio and Fox" of the item "name 3"of the file 141C, in the item values of the item "given name" of the integrated database 142a. The display control unit 152 also sets the priority associated with each item, in each item value. Since the priority of the item "name 3" of the file 141C is "5", the display control unit 152 sets the priority of the item values "Yukio and Fox" to "5" (step S41).

By comparing the key item "personal identification IDs" of the integrated database 142a, and if there are the same personal identification IDs, the display control unit 152 integrates the records of the same personal identification IDs. For example, the personal identification IDs of the third row and the sixth row in the integrated database 142a are both "3456" and are the same. Consequently, the display control unit 152 integrates the records, and generates the record of the third row of the integrated database 142b. While integrating the records, the display control unit 152 adopts "Takeda (10)" with a higher priority, between "Yukio Takeda (5)" in the third row and "Takeda (10)" in the sixth row that are registered in the item "surname", and sets "Takeda (10)" as the item value after the integration (step S42).

If there are a plurality of records with the same key items, the display control unit 152 may notify the manager's terminal 30 by outputting an alert. The display control unit 152 may also store information on the records before being integrated, in the storage unit 140.

Figure 10:
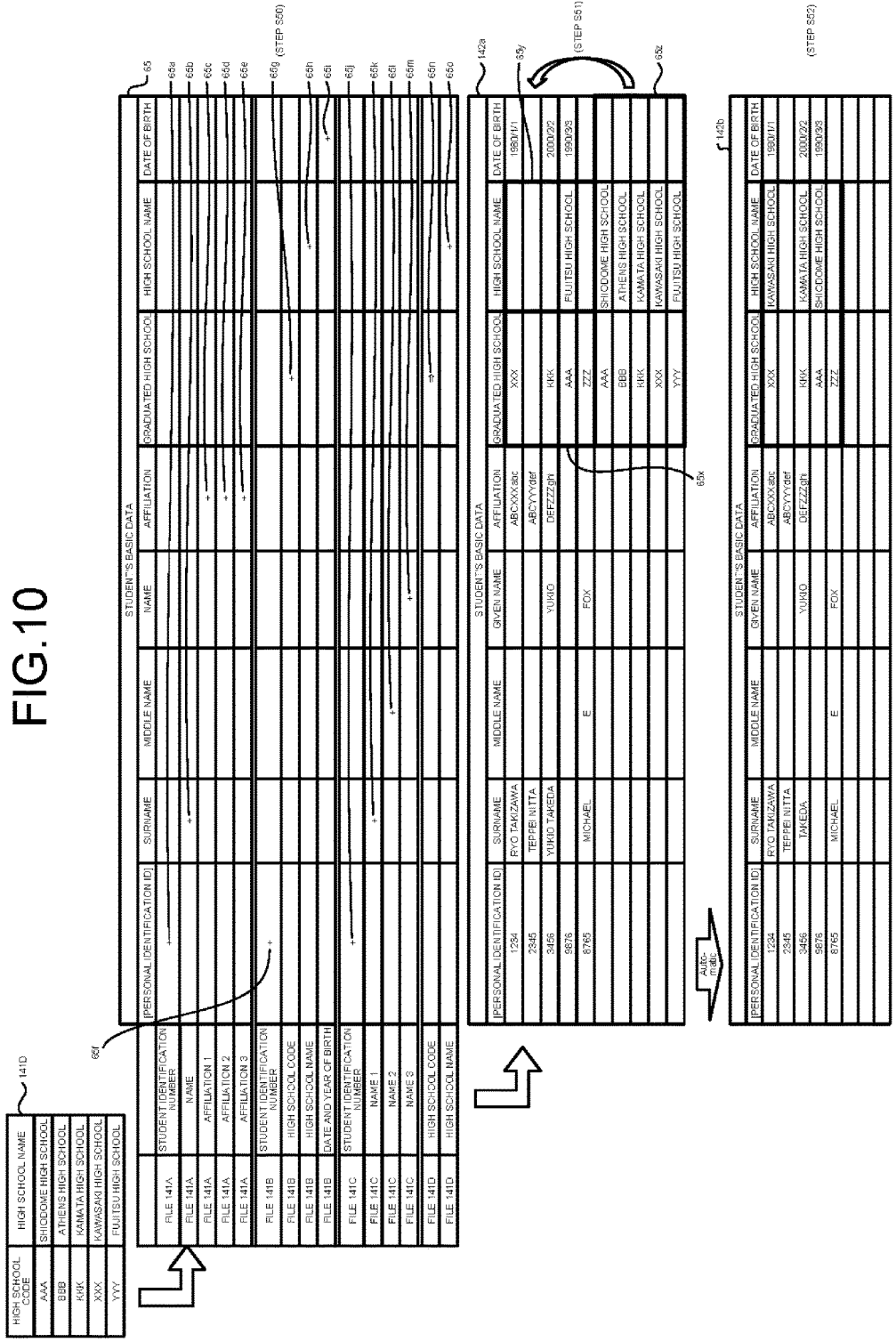
FIG. 10 is a diagram for explaining a process performed by the display control unit based on a rule 5.

FIG. 10 is a diagram for explaining a process performed by the display control unit based on the rule 5. The rule 5 is a rule in which a link is used to set which item be the key for the items excluding the key item, so as to store the item value of another item.

The display control unit 152 generates a matrix 65 in which the items of the files 141A, 141B, 141C, and 141D are arranged in the column direction, and the candidate items of the integrated database 142 are arranged in the row direction. In FIG. 10, illustrations of the files 141A to 141C are omitted. The items of the file 141D include high school code and high school name. The candidate items of the integrated database 142 include personal identification ID, surname, middle name, given name, affiliation, graduated high school, high school name, and date of birth.

When the manager who operates the manager's terminal 30 specifies maps 65b to 65e after specifying a map 65a for the key item "personal identification ID", the display control unit 152 receives the specification of the maps 65a to 65e. When the manager who operates the manager's terminal 30 specifies maps 65g to 65i after specifying a map 65f for the key item "personal identification ID", the display control unit 152 receives the specification of the maps 65f to 65i. When the manager who operates the manager's terminal 30 specifies maps 65k to 65m after specifying a map 65j for the key item "personal identification ID", the display control unit 152 receives the specification of the maps 65j to 65m.

When the manager who operates the manager's terminal 30 specifies a link 65n, and the display control unit 152 receives the specification of the link 65n, the display control unit 152 receives the specification of the map of the other item, even the map for the key item "personal identification ID" is not specified. In this example, it is assumed that the display control unit 152 receives the specification of a map 65o (step S50).

The display control unit 152 also performs the association described in the rule 4, based on the maps 65a to 65i, sets the priority of each of the item values, and integrates the values. Thus, the records from the first row to the fifth row of the integrated database 142a are generated. The records from the first row to the fifth row of the integrated database 142a illustrated in FIG. 10 will be the same as those in the integrated database 142b illustrated in FIG. 9. The explanation of priority is omitted in FIG. 10.

Based on the link 65n, the display control unit 152 temporarily stores the item values "AAA, BBB, KKK, XXX, and YYY" of the item "high school code" of the file 141D, in the item values of the item "graduated high school" of the integrated database 142a. Based on the map 65o, the display control unit 152 associates the item "high school name" of the file 141D with the candidate item "high school name" of the integrated database 142 Based on the association, the display control unit 152 stores the item values "Shiodome High School, Athens High School, Kamata High School, Kawasaki High School, and Fujitsu High School" of the item "high school name" of the file 141D, in the item values of the item "high school name" of the integrated database 142a (step S51).

Based on the item "graduated high school" in which the link 65n is specified, the display control unit 152 searches the item value associated with the item values in an area 65x, from the item values in an area 65z. The display control unit 152 sets the item value of the "high school name" in the same row as the searched item value, as the item value in an area 65y. For example, the item value "XXX" in the area 65x matches with the item value "XXX" in the area 65z, and the item value of the item "high school name" in the same row as the item value "XXX" in the area 65z is "Kawasaki High School". Thus, the display control unit 152 stores "Kawasaki High School" in the item value of the item "high school name" in the same row as the item value "XXX" in the area 65y. The display control unit 152 generates the integrated database 142b, by repeating the similar processes (step S52).

Figure 11:
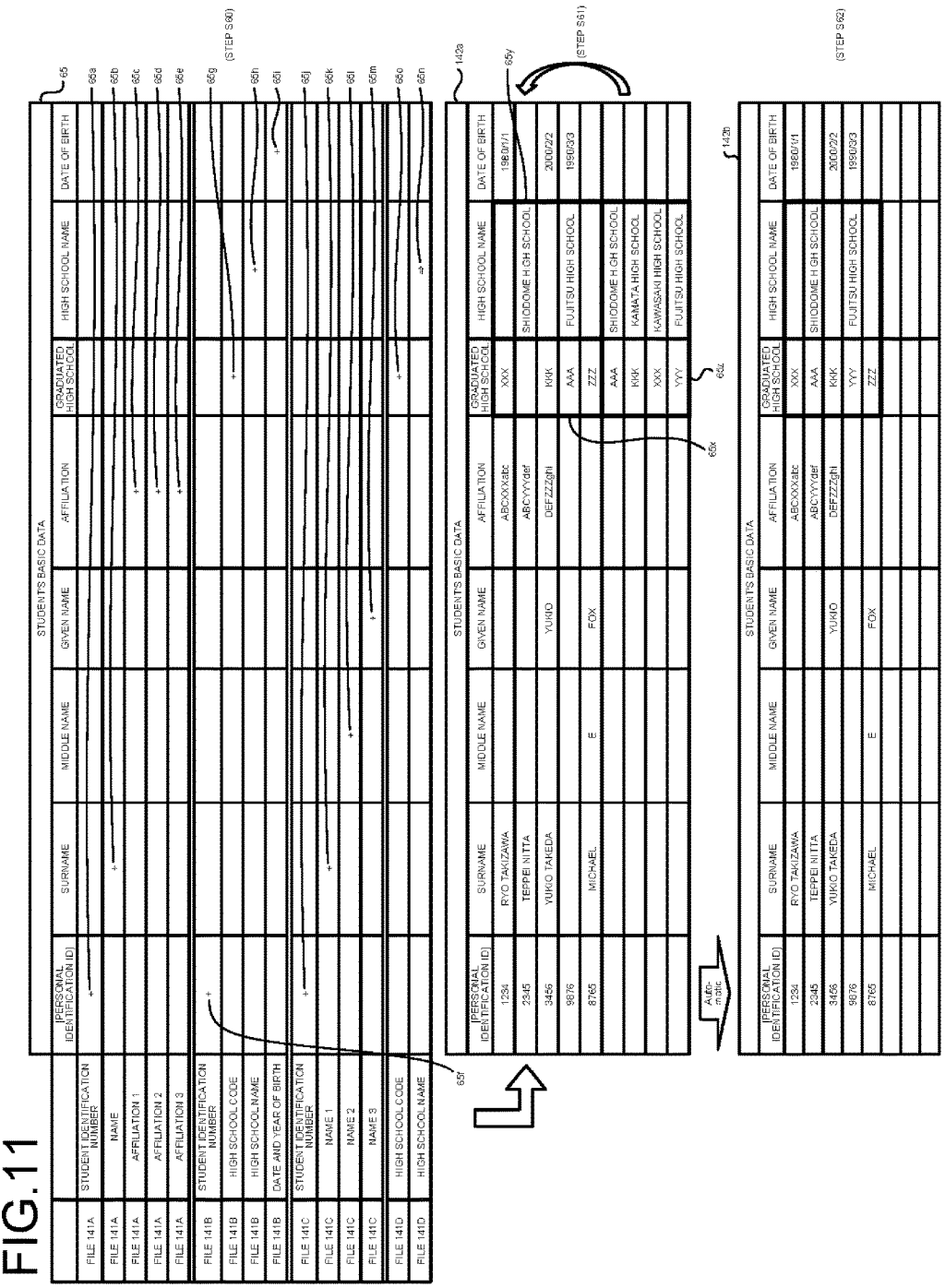
FIG. 11 is a diagram for supplementarily explaining the rule 5.

FIG. 11 is a diagram for supplementarily explaining the rule 5. In FIG. 10 and FIG. 11, the positions where the link 65n and the map 65o are specified are different (step S60). The description on the matrix 65 is the same as that on the matrix 65 described in FIG. 10.

The display control unit 152 also performs the association described in the rule 4, based on the maps 65a to 65i, sets the priority of each of the item values, and integrates the values. Thus, the records from the first row to the fifth row of the integrated database 142a are generated. The records from the first row to the fifth row of the integrated database 142a illustrated in FIG. 10 become the same as those of the integrated database 142b illustrated in FIG. 9. The explanation of priority is omitted in FIG. 10.

Based on the map 65o, the display control unit 152 associates the item "high school code" of the file 141D with the candidate item "graduated high school" of the integrated database 142. Based on the association, the item values "AAA, BBB, KKK, XXX, and YYY" of the item "high school code" of the file 141D are stored in the item values of the item "graduated high school" of the integrated database 142a.

Based on the link 65n, the display control unit 152 temporarily stores the item values "Shiodome High School, Athens High School, Kamata High School, Kawasaki High School, and Fujitsu High School" of the item "high school name" of the file 141D, in the item values of the item "high school name" of the integrated database 142a (step S61).

Based on the item "high school name" in which the link 65n is specified, the display control unit 152 searches the item value associated with the item value in the area 65y, from the area 65z. The display control unit 152 sets the item value of the "graduated high school" in the same row as the searched item value, to be the item value in the area 65x. For example, the item value "Shiodome High School" in the area 65y matches with the item value in the area 65z, and the item value of the item "graduated high school" in the same row as the item value "Shiodome High School" in the area 65z, is "AAA". Thus, the display control unit 152 stores "AAA" in the item value of the item "graduated high school" that is in the same row as the item value "Shiodome High School" in the area 65y. The display control unit 152 generates the integrated database 142b, by repeating the similar processes (step S62).

Figure 12:
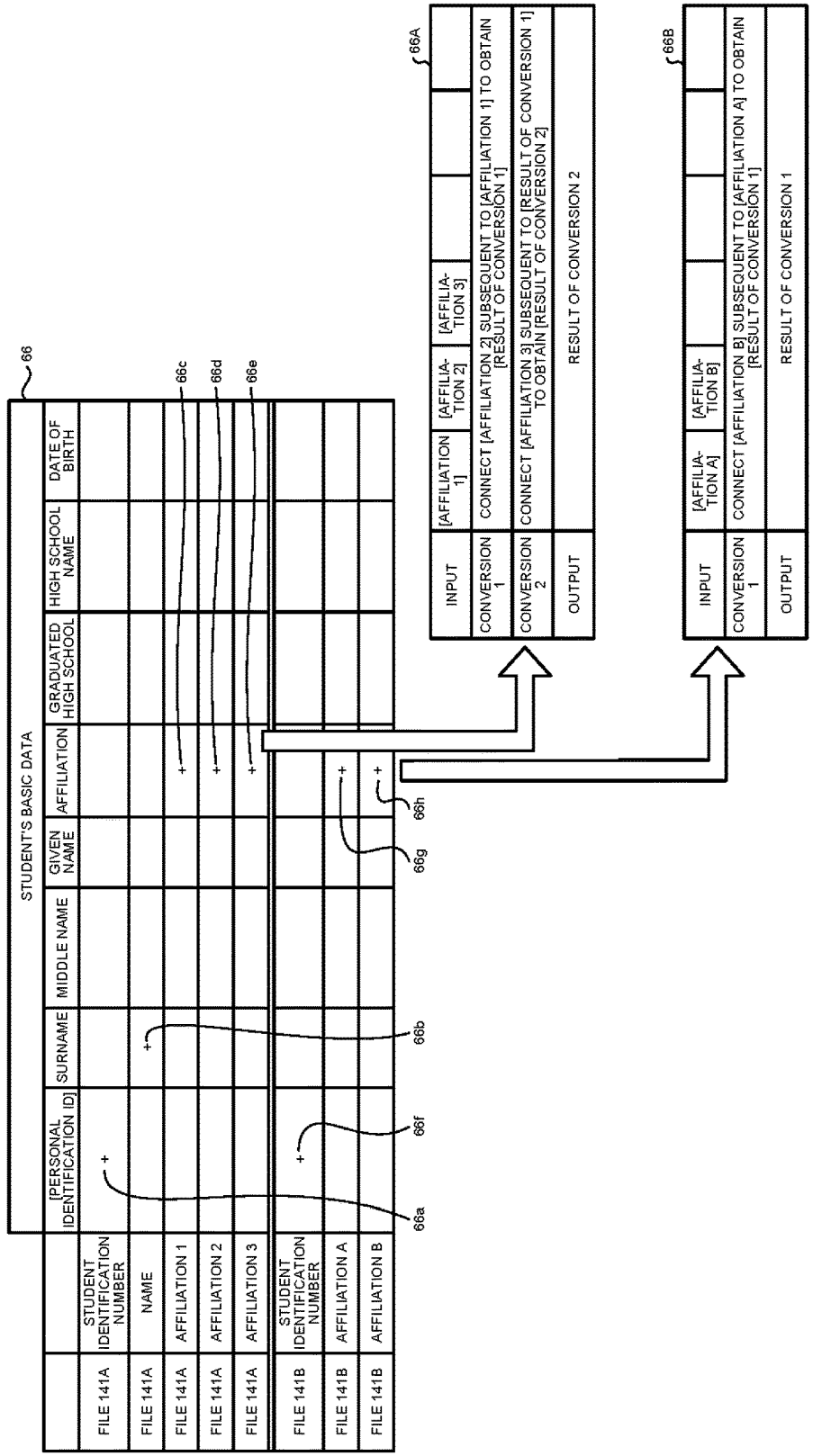
FIG. 12 is a diagram 1 for explaining a process performed by the display control unit based on a rule 6.

FIG. 12 is a diagram 1 for explaining a process performed by the display control unit based on the rule 6. The rule 6 is a rule in which an output is calculated, by using the item that is mapped in the same file, as an input. In FIG. 12, illustrations of the files 141A and 141B are omitted. The items of the file 141A are the same as the items of the file 141A illustrated in FIG. 5 and the like. The items of the file 141B include "student identification number, affiliation A, and affiliation B", respectively. The display control unit 152 generates a matrix 66 in which the items of the files 141A and 141B are arranged in the column direction, and the candidate items of the integrated database 142 are arranged in the row direction.

When the manager who operates the manager's terminal 30 specifies maps 66b to 66e after specifying a map 66a for the key item "personal identification ID", the display control unit 152 receives the specification of the maps 66b to 66e. Based on the maps 66a to 66e, the display control unit 152 associates the item of the file 141A with the item of the integrated database 142.

Upon receiving a display request of the conversion dialog of the maps 66c to 66e, the display control unit 152 displays a conversion dialog 66A. For example, the display control unit 152 receives a display request from the manager who operates the manager's terminal 30.

The conversion dialog 66A includes an input, conversion 1, conversion 2, and an output. The items "affiliation 1, affiliation 2, and affiliation 3" of the file specified by the maps 66c to 66e are stored in the input.

The conversion (conversion 1 and conversion 2) includes information for definition on how to convert the item values that are associated with the items included in the input. For example, it is described that in the initial setting of the conversion, the item values of the items are to be simply connected.

A definition that the conversion 1 indicates to connect the [affiliation 2] subsequent to the [affiliation 1], to obtain the [result of the conversion 1] is described. A definition that the conversion 2 indicates to connect the [affiliation 3] subsequent to the [result of the conversion 1], to obtain the [result of the conversion 2], is described.

The final conversion result is stored in the output. For example, the [result of the conversion 2] is stored in the output of the conversion dialog 66A.

For example, step S21 in FIG. 6 is obtained, when the display control unit 152 receives the specification of the maps 66c to 66e, converts based on the conversion dialog 66A, and stores the conversion results in the item values of the item "affiliation" of the integrated database 142.

When the manager who operates the manager's terminal 30 specifies maps 66g and 66h, after specifying a map 66f for the key item "personal identification ID", the display control unit 152 receives the specification of the maps 66f to 66h. Based on the maps 66f to 66h, the display control unit 152 associates the item of the file 141B with the item of the integrated database 142.

Upon receiving a display request of the conversion dialog of the maps 66g and 66h, the display control unit 152 displays a conversion dialog 66B. For example, it is assumed that the display control unit 152 receives the display request from the manager who operates the manager's terminal 30. The explanation on the input, the conversion 1, and the output are the same as those of the conversion dialog 66A.

Figure 13:
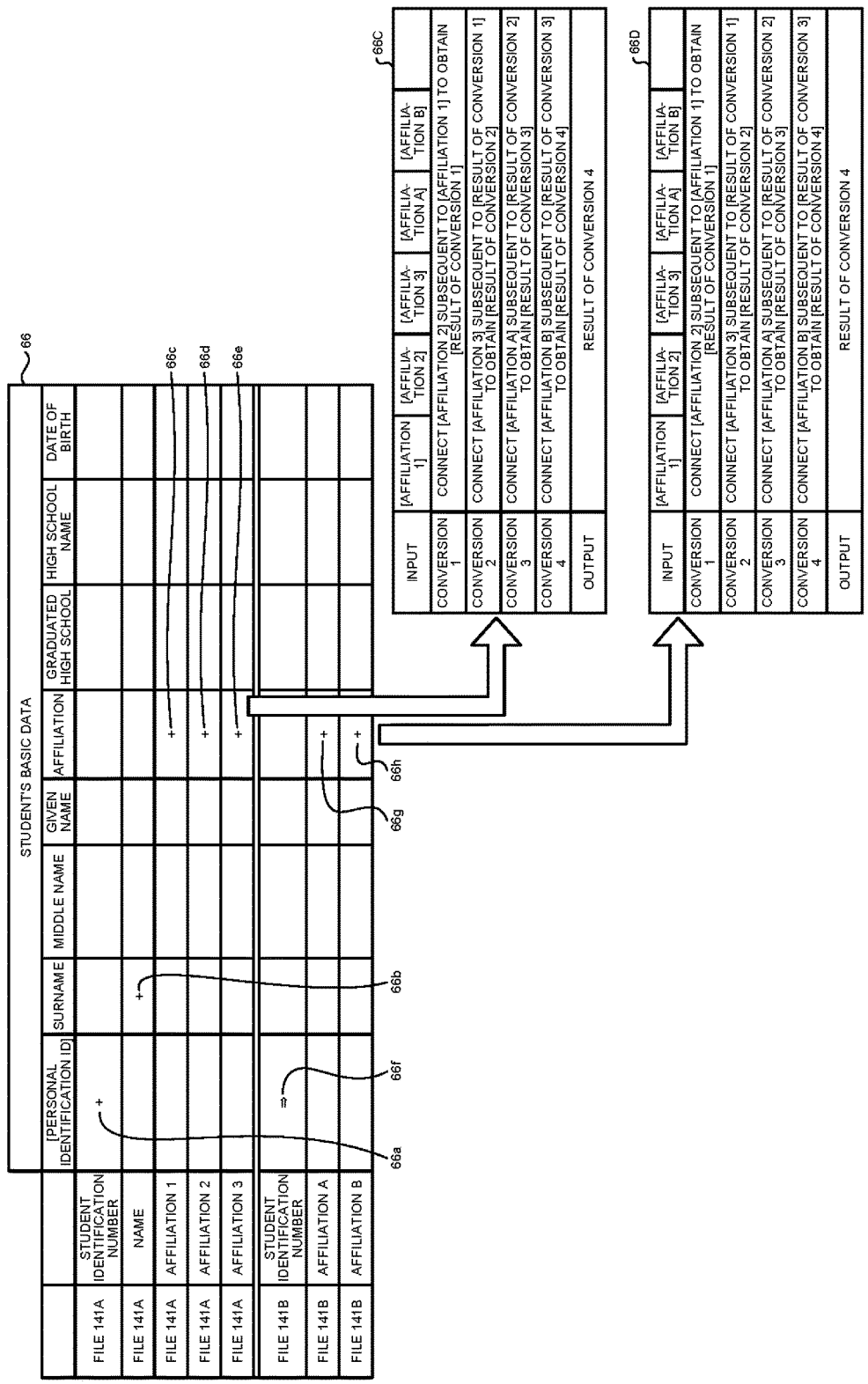
FIG. 13 is a diagram 2 for explaining the process performed by the display control unit based on the rule 6.

FIG. 13 is a diagram 2 for explaining the process performed by the display control unit based on the rule 6. Upon receiving a display request of the conversion dialog, while the link is being specified, the display control unit 152 displays a conversion dialog different from the conversion dialog illustrated in FIG. 12. The matrix 66 generated by the display control unit 152 is the same as the matrix 66 illustrated in FIG. 11. A link 66i is specified in the matrix 66.

Upon receiving a display request of the conversion dialog of the maps 66c to 66e, the display control unit 152 displays a conversion dialog 66C. For example, the display control unit 152 receives the display request from the manager who operates the manager's terminal 30.

The conversion dialog 66C includes an input, conversion 1, conversion 2, conversion 3, conversion 4, and an output. The item values "affiliation 1, affiliation 2, affiliation 3, affiliation A, and affiliation B" of the file specified by the maps 66c to 66e, 66g, and 66h are stored in the input. According to the instruction by the link 66i, the display control unit 152 connects the items "affiliation 1, affiliation 2, and affiliation 3" of the file 141A and the items "affiliation A and affiliation B" of the file 141B that are present in the same column of the candidate item. The display control unit 152 then stores these connected items in the input in the conversion dialog 66C.

The conversion (conversion 1 to 4) includes information for definition on how to convert the item values that are associated with the items included in the input. For example, it is described that in the initial setting of the conversion, the item values of the items are to be simply connected. Although the description is omitted, the conversion includes conversion using a correspondence table, division using specific characters, segmentation of characters, a process of filling with specific characters, a process of unifying with double-byte characters or single-byte characters, and a process of unifying with uppercase letters or lowercase letters, in addition to connecting the characters. It is assumed that the manager sets in advance the initial value of the conversion.

A definition that the conversion 1 indicates to connect the [affiliation 2] subsequent to the [affiliation 1], to obtain the [result of the conversion 1] is described. A definition that the conversion 2 indicates to connect the [affiliation 3] subsequent to the [result of the conversion 1], to obtain the [result of the conversion 2] is described. A definition that the conversion 3 indicates to connect the [affiliation A] subsequent to the [result of the conversion 2], to obtain the [result of the conversion 3] is described. A definition that the conversion 4 indicates to connect the [affiliation B] subsequent to the [result of the conversion 3], to obtain the [result of the conversion 4] is described.

The final conversion result is stored in the output. For example, the [result of the conversion 4] is stored in the output in the conversion dialog 66C.

The display control unit 152 receives the specification of the maps 66c to 66e, 66g, and 66h, converts based on the conversion dialog 66C, and stores the conversion results in the item values of the item "affiliation" of the integrated database 142.

Upon receiving a display request of the conversion dialog of the maps 66g and 66h, the display control unit 152 displays a conversion dialog 66D. For example, the display control unit 152 receives the display request from the manager who operates the manager's terminal 30. The explanation on the input, the conversion 1 to conversion 4, and the output are the same as those in the conversion dialog 66C.

Figure 14:
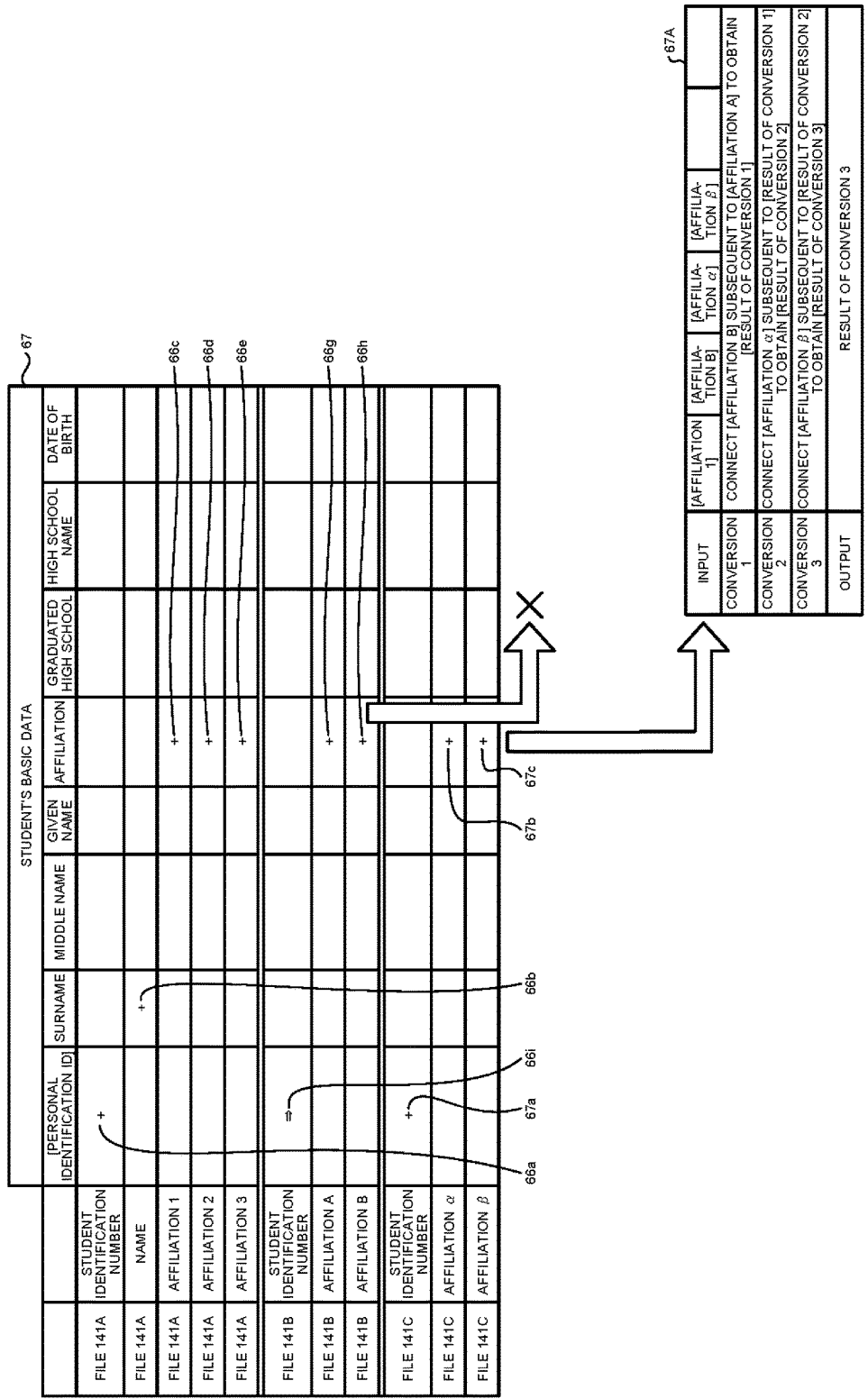
FIG. 14 is a diagram 3 for explaining the process performed by the display control unit based on the rule 6.

FIG. 14 is a diagram 3 for explaining the process performed by the display control unit based on the rule 6. In FIG. 14, a matrix 67 including the items of the files 141A, 141B, and 141C are displayed, and the link 66i is specified in the file 141B.

Upon receiving a display request of the conversion dialog of the maps 66g and 66h, the display control unit 152 outputs an error, because the display control unit 152 is not able to determine whether the link 66i is regarding the file 141A or the file 141C.

Upon receiving a display request of the conversion dialog of maps 67b and 67c, the display control unit 152 displays a conversion dialog 67A. For example, the display control unit 152 receives the display request from the manager who operates the manager's terminal 30.

The conversion dialog 67A includes an input, conversion 1, conversion 2, conversion 3, and an output. The item values "affiliation A, affiliation B, affiliation α, and affiliation β" of the file specified by the maps 66g, 66h, 67b, and 67c are stored in the input. According to the instruction by the link 66i, the display control unit 152 connects the items "affiliation A and affiliation B" of the file 141B and the items "affiliation α and affiliation β" of the file 141C that are present in the same column of the candidate item. The display control unit 152 then stores these connected items in the input in the conversion dialog 67A.

The conversion (conversions 1 to 3) includes information for definition on the item values that are associated with the items included in the input. For example, it is described that in the initial setting of the conversion, the item values of the items are to be simply connected.

A definition that the conversion 1 indicates to connect the [affiliation B] subsequent to the [affiliation A], to obtain the [result of the conversion 1] is described. A definition that the conversion 2 indicates to connect the [affiliation α] subsequent to the [result of the conversion 1], to obtain the [result of the conversion 2] is described. A definition that the conversion 3 indicates to connect the [affiliation β] subsequent to the [result of the conversion 2], to obtain the [result of the conversion 3] is described.

The final conversion result is stored in the output. For example, the [result of the conversion 3] is stored in the output in the conversion dialog 67A.

FIG. 15 is a diagram 1 for explaining a process performed by the display control unit based on the rule 7. The rule 7 is a rule in which information may be added, edited, or deleted, regarding the input and conversion in the conversion dialog. In FIG. 15, the conversion 3 is added to the conversion dialog 66A illustrated in FIG. 12.

For example, upon receiving a display request of the maps 66c to 66e illustrated in FIG. 12, the display control unit 152 displays the conversion dialog 66A. When the conversion dialog 66A is displayed, the manager operates the manager's terminal 30 and adds and registers the conversion 3. For example, a definition that the conversion 3 indicates to obtain the [result of the conversion 3], by converting the [result of the conversion 2] using a conversion table is described.

When the conversion 3 is added, the display control unit 152 updates the content of the output, based on the content of the added conversion 3. For example, the display control unit 152 executes a process of adding the conversion result that is defined in the last row of the conversion, in the output. In the example illustrated in FIG. 15, the display control unit 152 stores the [result of the conversion 3] in the output.

FIG. 16 is a diagram 2 for explaining the process performed by the display control unit based on the rule 7. In FIG. 16, the conversion dialog 66A illustrated in FIG. 12 is edited.

For example, upon receiving a display request of the maps 66c to 66e illustrated in FIG. 12, the display control unit 152 displays the conversion dialog 66A. When the conversion dialog 66A is displayed, the manager operates the manager's terminal 30, and edits the conversion 2. For example, the manager edits the content of the conversion 2 in the conversion dialog 66A to the content of the conversion 2 in a conversion dialog 68B.

Figure 17:
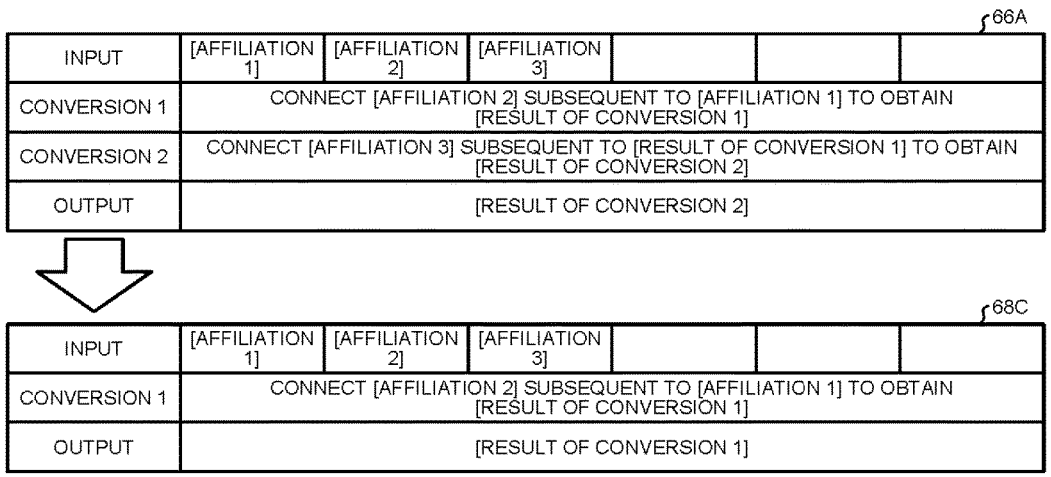
FIG. 17 is a diagram 3 for explaining the process performed by the display control unit based on the rule 7.

FIG. 17 is a diagram 3 for explaining the process performed by the display control unit based on the rule 7. In FIG. 17, the record of a certain conversion in the conversion dialog 66A illustrated in FIG. 12 is deleted.

For example, upon receiving a display request of the maps 66c to 66e illustrated in FIG. 12, the display control unit 152 displays the conversion dialog 66A. When the conversion dialog 66A is displayed, the manager operates the manager's terminal 30 and requests to delete the record of the conversion 2, for example. Upon receiving the request to delete the record of the conversion 2, the display control unit 152 generates a conversion dialog 66C by deleting the record of the conversion 2.

By deleting the record of the conversion 2, the display control unit 152 executes a process of adding the conversion result that is defined in the last row of the conversion, in the output. In the example illustrated in FIG. 17, the display control unit 152 stores the "result of the conversion 1" in the output.

Figure 18:
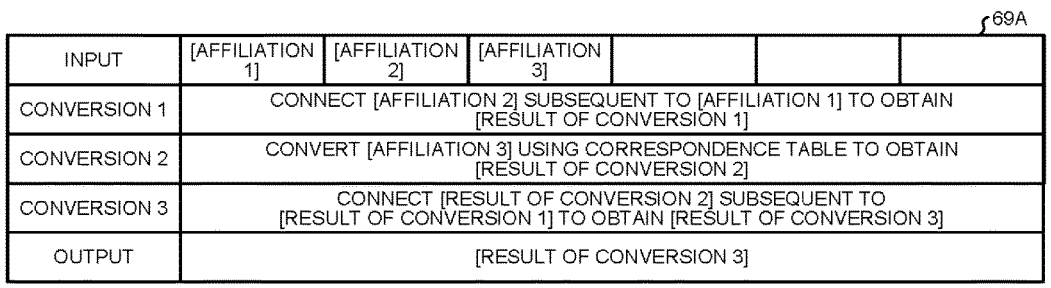
FIG. 18 is a diagram for explaining a process performed by the display control unit based on a rule 8.

FIG. 18 is a diagram for explaining a process performed by the display control unit based on the rule 8. The rule 8 is a rule in which the content of the next conversion can be defined, by combining the processes that are defined by a plurality of conversions. In FIG. 18, the conversion 3 is added to a conversion dialog 69A, and the process of the conversion 3 is defined using the results of the conversion 1 and the conversion 2.

When the display control unit 152 displays the conversion dialog 69A, the manager operates the manager's terminal 30 to add and register the conversion 3. For example, a definition that the conversion 3 indicates to connect the [result of the conversion 2] subsequent to the [result of the conversion 1], to obtain the [result of the conversion 3] is described. In the conversion 3, the process of the conversion 3 is defined by using the results of the conversion 1 and the conversion 2.

Figure 19:
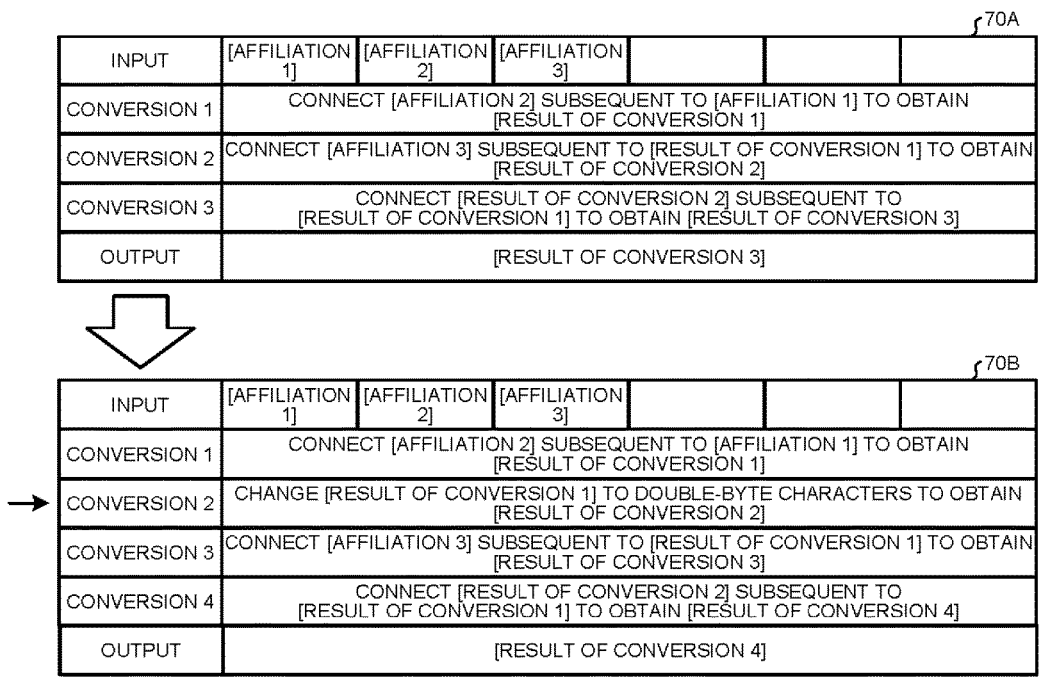
FIG. 19 is a diagram 1 for explaining a process performed by the display control unit based on a rule 9.

FIG. 19 is a diagram 1 for explaining a process performed by the display control unit based on the rule 9. The rule 9 is a rule in which when the record is added or deleted to or from a certain conversion, while the records of conversions are being set, "*" in the "result of the conversion *" included in the record of the conversion is incremented or decremented.

In FIG. 19, the record of the conversion is added. It is assumed that the display control unit 152 displays a conversion dialog 70A. The [affiliation 1], the [affiliation 2], and the [affiliation 3] are stored in the input in the conversion dialog 70A. The conversion 1 indicates to connect the [affiliation 2] subsequent to the [affiliation 1], to obtain the [result of the conversion 1]. The conversion 2 indicates to connect the [affiliation 3] subsequent to the [result of the conversion 1], to obtain the [result of the conversion 2]. The conversion 3 indicates to connect the [result of the conversion 2] subsequent to the [result of the conversion 1], to obtain the [result of the conversion 3]. The [result of the conversion 3] is stored in the output.

When the display control unit 152 displays the conversion dialog 70A, the manager operates the manager's terminal 30, and adds and registers a record of the conversion 2 in the row subsequent to the conversion 1. For example, the conversion 2 being added and registered indicates to change the [result of the conversion 1] to the double-byte characters, to obtain the [result of the conversion 2].

When the new record of the conversion 2 is added, the display control unit 152 corrects the conversion 2 in the conversion dialog 70A to the conversion 3. The display control unit 152 also increments the value 2 in the [result of the conversion 2], in the record of the conversion 2 included in the conversion dialog 70A. Consequently, the display control unit 152 changes the [result of the conversion 2] to the [result of the conversion 3], and sets the [result of the conversion 3] in a conversion dialog 70B. Because the [result of the conversion 1] in the record of the conversion 2 that is included in the conversion dialog 70A is converted before the added conversion 2, the display control unit 152 does not increment the value.

When the new record of the conversion 2 is added, the display control unit 152 corrects the conversion 3 in the conversion dialog 70B to the conversion 4. The display control unit 152 also increments the value 2 in the [result of the conversion 3], in the record of the conversion 3 included in the conversion dialog 70A. Consequently, the display control unit 152 changes the [result of the conversion 3] to the [result of the conversion 4], and sets the [result of the conversion 4] in the conversion dialog 70B.

The display control unit 152 stores the [result of the conversion 4] included in the conversion 4 in the conversion dialog 70B in the output.

Figure 20:
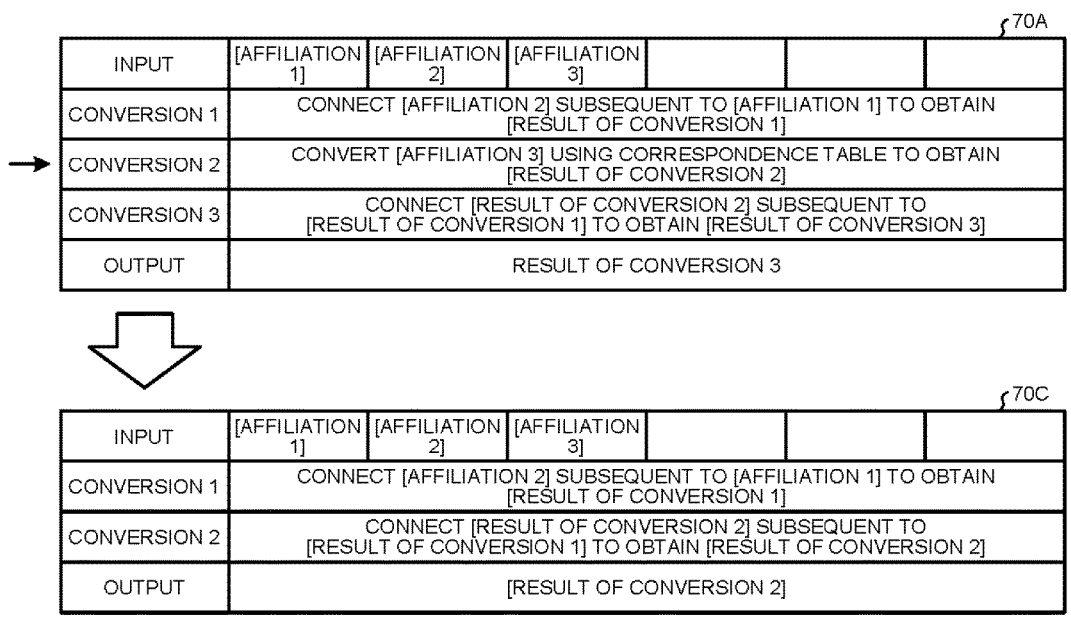
FIG. 20 is a diagram 2 for explaining the process performed by the display control unit based on the rule 9.

FIG. 20 is a diagram 2 for explaining the process performed by the display control unit based on the rule 9. In FIG. 20, the record of the conversion is deleted. Because the explanation on the conversion dialog 70A is the same as that in FIG. 19, the description thereof is omitted.

When the display control unit 152 displays the conversion dialog 70A, the manager operates the manager's terminal 30 and deletes the record of the conversion 2.

When the record of the conversion 2 is deleted, the display control unit 152 corrects the conversion 2 in the conversion dialog 70A to the conversion 3. The display control unit 152 also decrements the value 3 in the [result of the conversion 3] in the record of the conversion 3 that is included in the conversion dialog 70A. Consequently, the display control unit 152 changes the [result of the conversion 3] to the [result of the conversion 2], and sets the [result of the conversion 2] in a conversion dialog 70C. Because the [result of the conversion 1] in the record of the conversion 3 that is included in the conversion dialog 70A is converted before the deleted conversion 2, the display control unit 152 does not decrement the value. If the initial value of the [result of the conversion o] is null, the [result of the conversion 1] is stored in the [result of the conversion 2], by connecting the [result of the conversion 2] subsequent to the [result of the conversion 1], to obtain the [result of the conversion 2].

The display control unit 152 stores the [result of the conversion 2] included in the conversion 2 of the conversion dialog 70C, in the output.

Figure 21:
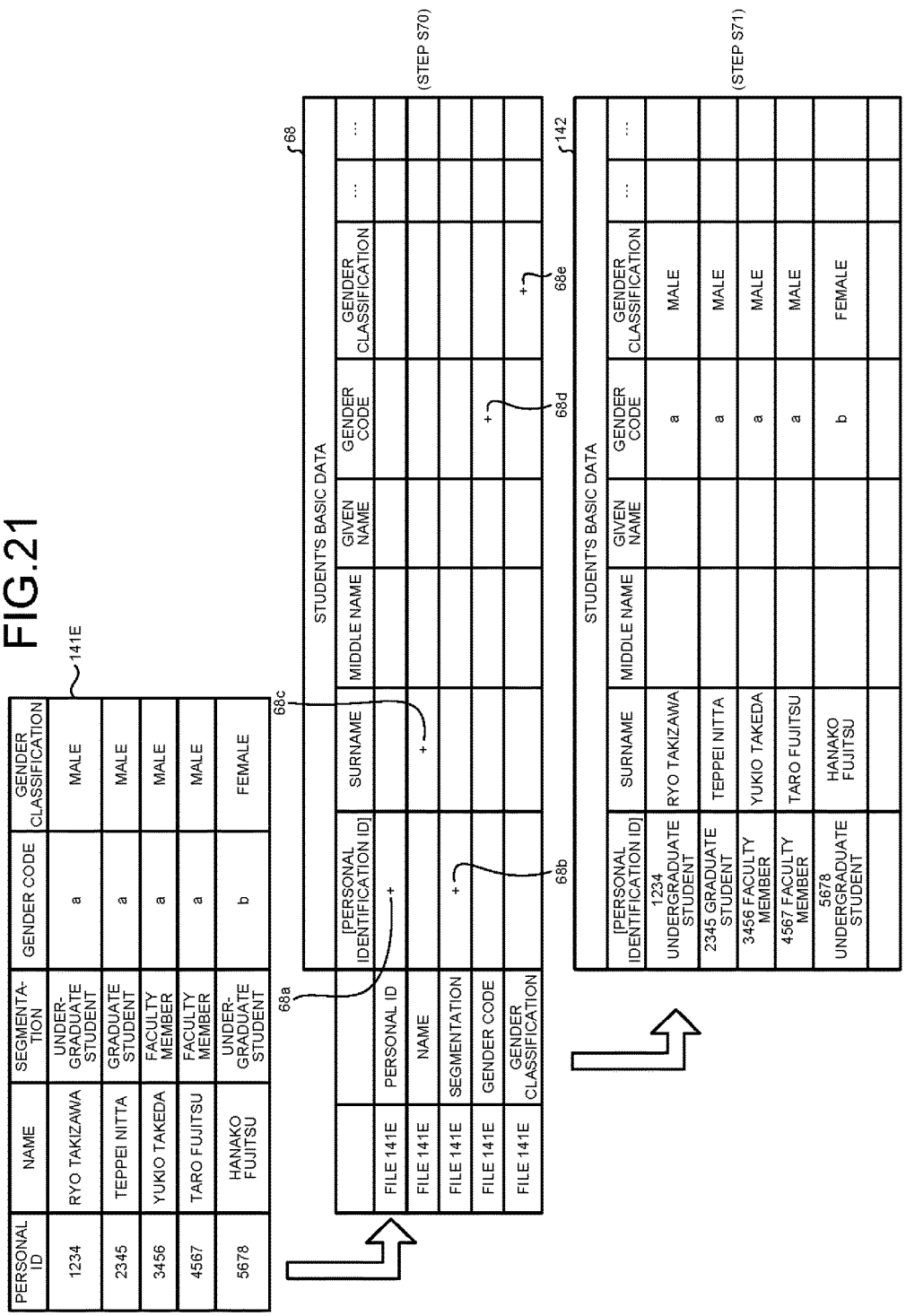
FIG. 21 is a diagram 1 for explaining a process performed by the display control unit based on a rule 10.
Figure 22:
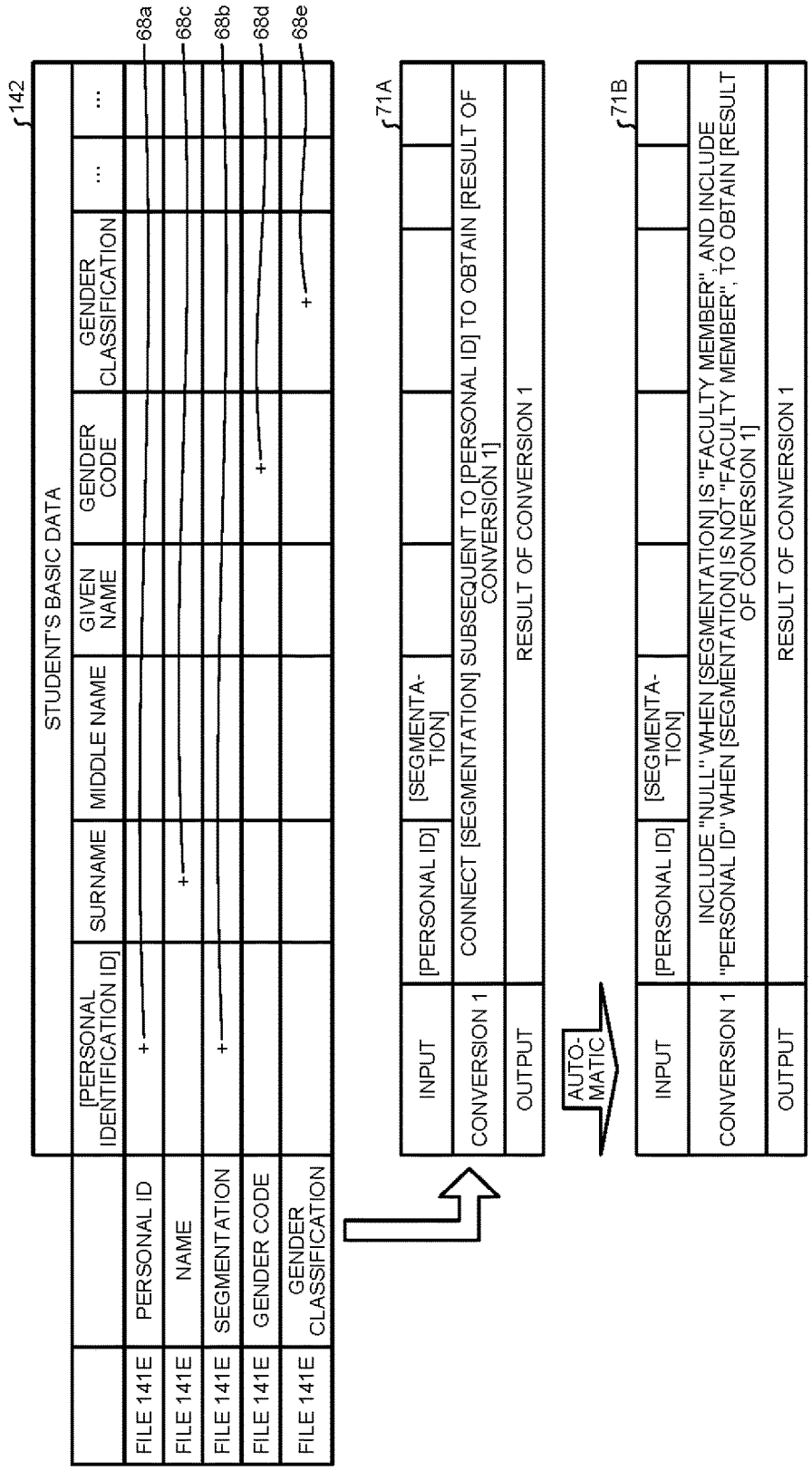
FIG. 22 is a diagram 2 for explaining the process performed by the display control unit based on the rule 10.
Figure 23:
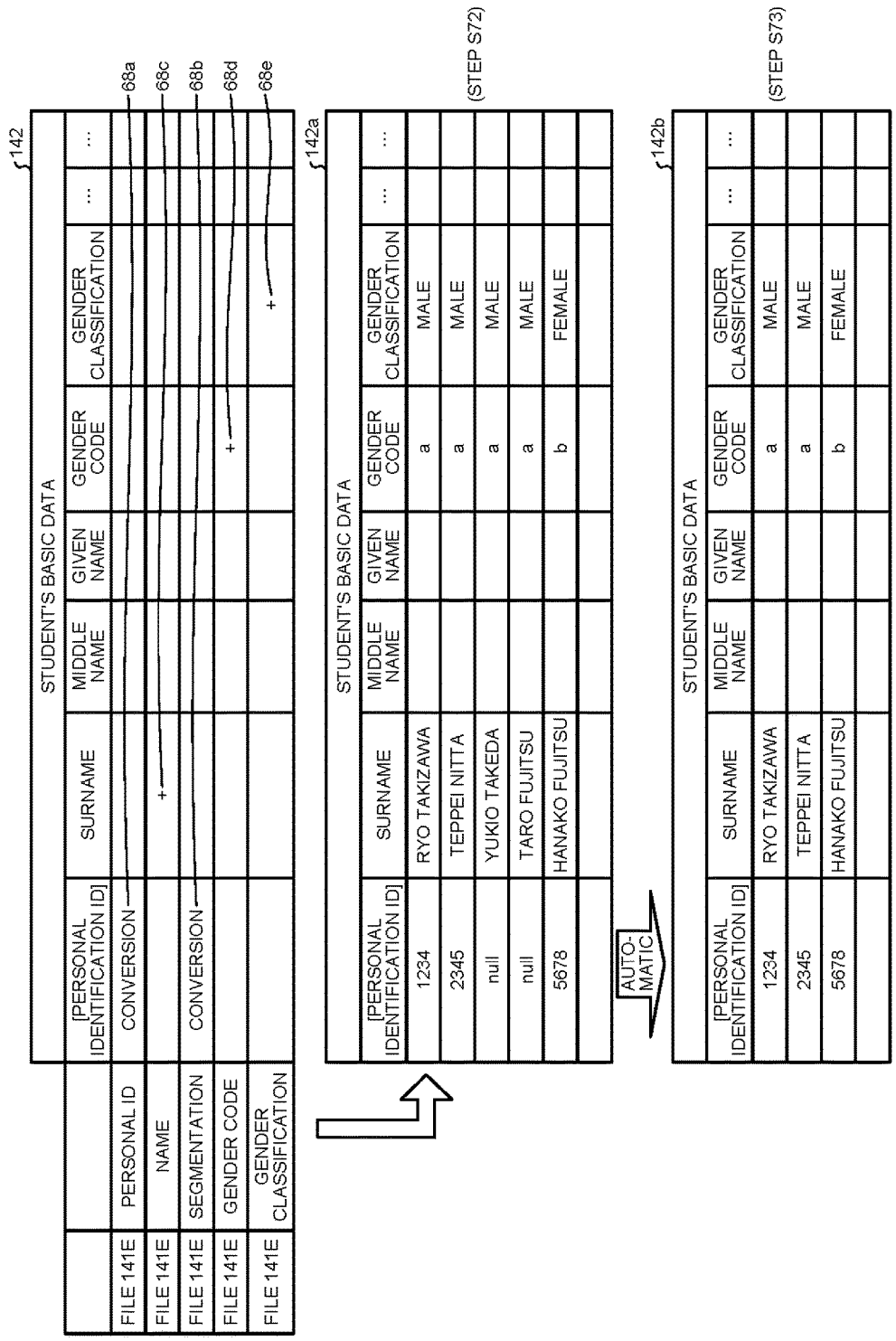
FIG. 23 is a diagram 3 for explaining the process performed by the display control unit based on the rule 10.

FIG. 21, FIG. 22, and FIG. 23 are diagrams for explaining a process performed by the display control unit based on the rule 10. The rule 10 is a rule in which when the final output of the key item of the integrated database 142 is null, the record is to be deleted. In FIG. 21, a file 141E is used for the explanation. The items of the file 141E include personal ID, name, segmentation, gender code, and gender classification. The candidate items of the integrated database include personal identification ID, surname, middle name, given name, gender code, and gender classification. The key item of the integrated database 142 is the "personal identification ID".

The display control unit 152 generates a matrix 68 in which the items of the file 141E are arranged in the column direction, and the candidate items of the integrated database 142 are arranged in the row direction. When the manager specifies maps 68*c* to 68*e* after specifying maps 68*a* and 68*b* for the key item "personal identification ID", the display control unit 152 receives the specification of the maps 68*a* to 68*e*. Based on the maps 68*a* to 68*e*, the display control unit 152 associates the item of the file 141E with the candidate item of the integrated database 142 (step S70).

Based on the maps 68*a* and 68*b*, the display control unit 152 associates the items "personal ID" and "segmentation" of the file 141E, with the personal identification ID of the integrated database 142. Based on the association, the display control unit 152 generates item values "1234 undergraduate student, 2345 graduate student, 3456 faculty member, 4567 faculty member, and 5678 undergraduate student" that are obtained by simply connecting the "personal ID" and the "segmentation" of the file 141E. The display control unit 152 then stores the simply connected item values in the item values of the personal identification ID of the integrated database 142.

Based on the map 68*c*, the display control unit 152 associates the item "name" of the file 141E with the candidate item "surname" of the integrated database 142. Based on the association, the display control unit 152 stores the item values "Ryo Takizawa, Teppei Nitta, Yukio Takeda, Taro Fujitsu, and Hanako Fujitsu" of the "name" of the file 141E, in the item values of the "surname" of the integrated database 142.

Based on the map 68*d*, the display control unit 152 associates the item "gender code" of the file 141E with the candidate item "gender code" of the integrated database 142. Based on the association, the display control unit 152 stores the item values "a, a, a, a, and b" of the "gender code" of the file 141E, in the item values of the "gender code" of the integrated database 142.

Based on the map 68*e*, the display control unit 152 associates the item "gender classification" of the file 141E with the candidate item "gender classification" of the integrated database 142. Based on the association, the display control unit 152 stores the item values "male, male, male, male, and female" of the item "gender classification" of the file 141E, in the item values of the item "gender classification" of the integrated database 142 (step S71).

Referring now to FIG. 22, upon receiving a display request of the conversion dialog of the maps 68*a* and 68*b*, the display control unit 152 displays a conversion dialog 71A. For example, the display control unit 152 receives the display request from the manager who operates the manager's terminal 30.

The conversion dialog 71A includes an input, conversion 1, and an output. The items "personal ID and segmentation" of the file that are specified by the maps 68*a* and 68*b* are stored in the input.

The conversion (conversion 1) includes information for definition on how to convert the item values that are associated with the items included in the input. For example, it is described that in the initial setting of the conversion, the item values of the items are to be simply connected. It is described that the conversion 1 indicates to "connect the [segmentation] subsequent to the [personal ID], to obtain the [result of the conversion 1]".

The final conversion result is stored in the output. For example, the [result of the conversion 1] is stored in the output in the conversion dialog 71A.

The manager generates a conversion dialog 71B, by operating the manager's terminal 30 and changing the record of the conversion 1 in the conversion dialog 71A. For example, it is described that the conversion 1 in the conversion dialog 71B indicates to "include 'null' when the [segmentation] is the 'faculty member', and include the "personal ID" when the [segmentation] is not the 'faculty member', to obtain the [result of the conversion 1]".

Referring now to FIG. 23, when the conversion dialog 71B illustrated in FIG. 22 is set, the display control unit 152 switches the icons associated with the maps 68a and 68b of the integrated database 142, to "convert".

Based on a conversion dialog 71, the display control unit 152 converts the item value of the item "personal identification ID" of the integrated database 142. Because the item value of the segmentation of the record in the first row of the file 141E is the "undergraduate student", the display control unit 152 sets the item value of the personal identification ID to be "1234", based on the definition of the conversion 1. Because the item value of the segmentation of the record in the second row of the file 141E is the "graduate student", the display control unit 152 sets the item value of the personal identification ID to be "2345", based on the definition of the conversion 1.

Because the item values of the segmentation of the records in the third and fourth rows of the file 141E are "faculty member", the display control unit 152 sets the item values of the personal identification ID to be "null", based on the definition of the conversion 1. Because the item value of the segmentation of the record in the fifth row of the file 141E is "undergraduate student", the display control unit 152 sets the item value of the personal identification ID to be "5678", based on the definition of the conversion 1 (step S72).

The display control unit 152 sets the item values of the records in the third and fourth rows of the key item "personal identification ID" of the integrated database 142a to be "null". Thus, the display control unit 152 generates an integrated database 142b, by deleting the records in the third and fourth rows of the integrated database 142a (step S73).

Figure 24:
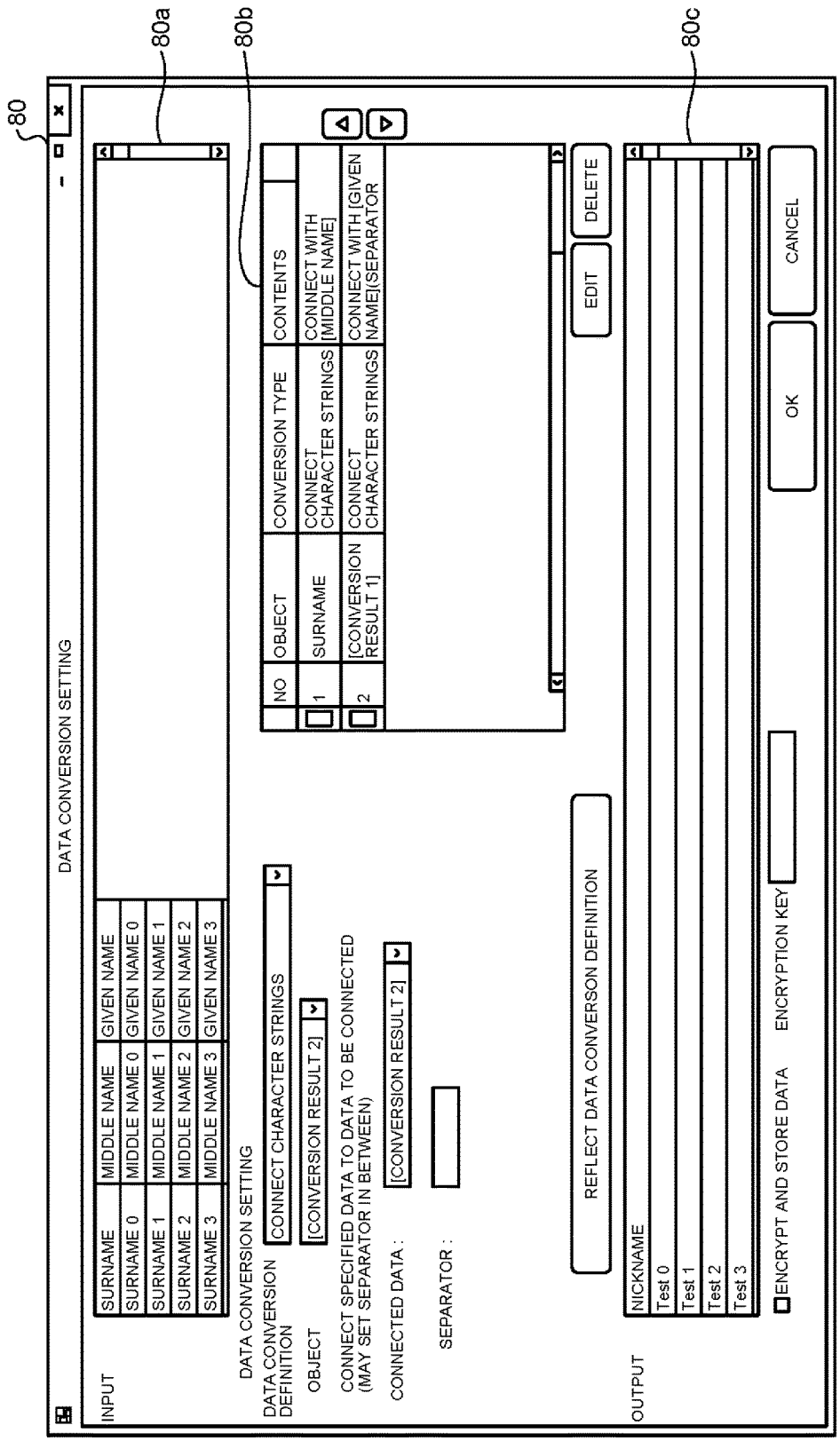
FIG. 24 is a diagram for explaining another conversion dialog.

In this example, the conversion dialogs described above are not limited to those illustrated in FIG. 12 to FIG. 23. The display control unit 152 may also display a conversion dialog illustrated in FIG. 24. FIG. 24 is a diagram for explaining another conversion dialog. A conversion dialog 80 illustrated in FIG. 24 includes an input area 80a, a conversion area 80b, and an output area 80c. The input area 80a is an area for displaying the content of the input described above. The conversion area 80b is an area for displaying the content of the conversion described above. The output area 80c is an area for displaying the content of the output described above.

Figure 25:
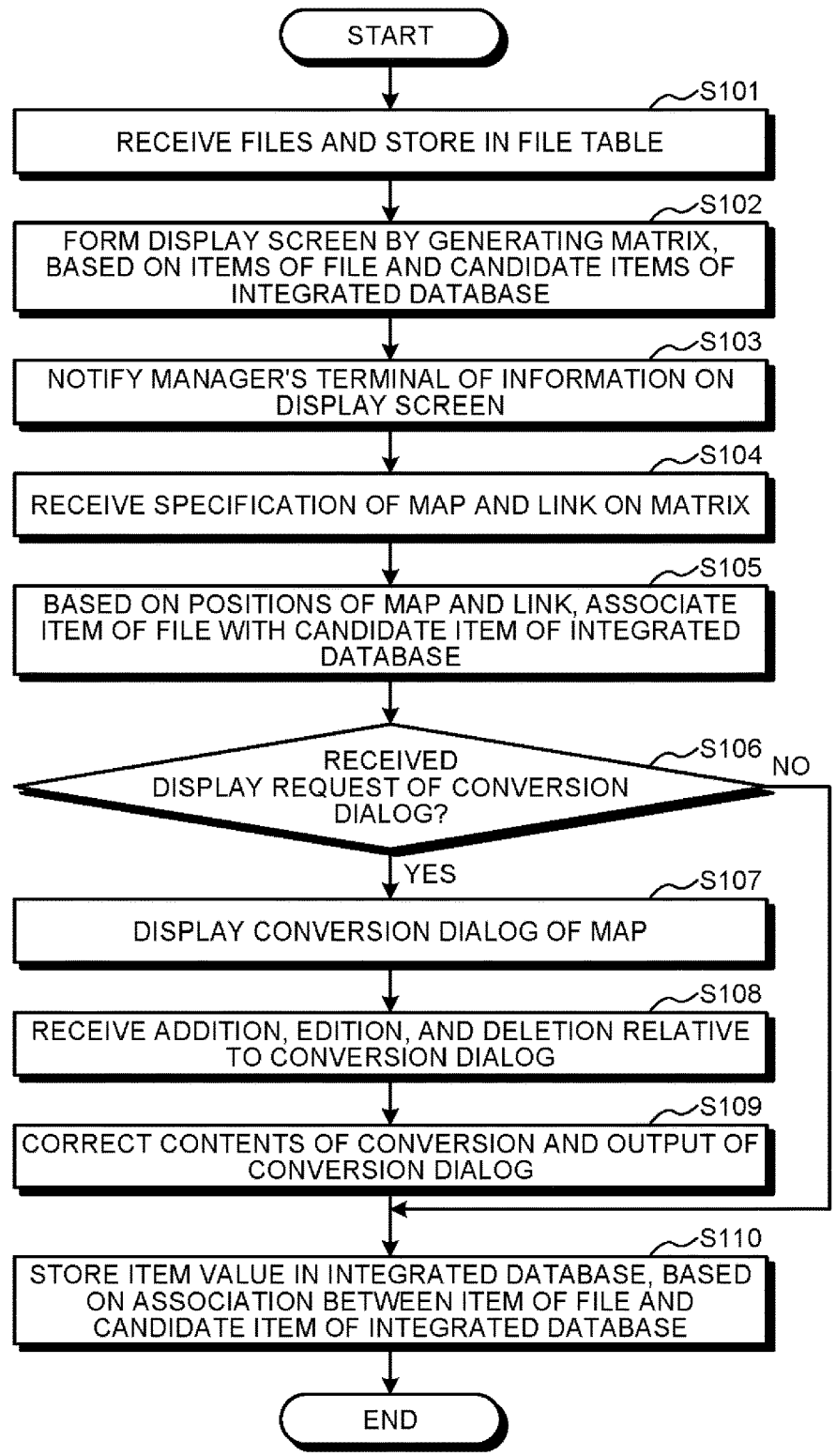
FIG. 25 is a flowchart illustrating a processing procedure of the information processing device according to the present embodiment.

Next, a processing procedure of the information processing device 100 according to the present embodiment will be described. FIG. 25 is a flowchart illustrating a processing procedure of the information processing device according to the present embodiment. As illustrated in FIG. 25, the reception unit 151 of the information processing device 100 receives files from the systems 10 and the terminal device 20, and stores the files in the file table 141 (step S101).

The display control unit 152 of the information processing device 100 forms a display screen by generating a matrix, based on the items of the files and the candidate items of the integrated database 142 (step S102). The information processing device 100 notifies the manager's terminal 30 of the information on the display screen (step S103).

The display control unit 152 receives the specification of the map and the link on the matrix (step S104). Based on the positions of the map and the link, the display control unit 152 associates the item of the file with the candidate item of the integrated database (step S105).

The display control unit 152 determines whether a display request of the conversion dialog is received from the manager who operates the manager's terminal 30 (step S106). When the display control unit 152 has not received the display request of the conversion dialog (No at step S106), the process proceeds to step S110.

When the display control unit 152 receives the display request of the conversion dialog (Yes at step S106), the display control unit 152 displays the conversion dialog of the map (step S107). The display control unit 152 receives addition, edition, and deletion regarding the conversion dialog (step S108). At step S108, for example, as described in the rule 7 and the like in FIG. 15 to FIG. 17, the manager who operates the manager's terminal 30 adds, edits, or deletes regarding the conversion dialog.

The display control unit 152 corrects the contents of the conversion and the output in the conversion dialog (S109). At step S109, as described in the rule 7 and the like, the display control unit 152 corrects the content of the conversion and the content of the output, for the addition, edition, or deletion regarding the conversion dialog.

The display control unit 152 stores the item value in the integrated database 142, based on the association between the item of the file and the candidate item of the integrated database 142 (step S110). For example, as described in the rules 1 to 5, and the like, at step S110, the display control unit 152 stores the item value in the integrated database 142.

Next, effects of the information processing device 100 according to the present embodiment will be described. The information processing device 100 generates a matrix in which the items included in the file and the candidate items included in the integrated database 142 are arranged, and receives the specification of a set of associated item and candidate item, by the specification of the position on the matrix. The information processing device 100 also stores the item value of the item to be associated, as the item value of the integrated database 142 for the association destination. Because the manager can associate the item of the file with the candidate item of the integrated database 142 while visually confirming the item and the candidate item using the matrix, the item value can be easily associated with the candidate item of the association destination.

When two or more items of the file are to be associated with a specific item in the candidate items, the information processing device 100 stores an item value obtained by connecting the item values of the items in a predetermined order, as the item value of the specific item. Consequently, even if items are to be associated with the specific item, a suitable item value can be set as the item value of the specific item.

When the information processing device 100 receives the specification of two or more positions that are associated with a specific item of the file and that are associated with two or more candidate items, on the matrix, the information processing device 100 stores a value associated with the specific item as the item values of the specified candidate items. Consequently, the item value of a single item of the file can be easily associated with the items of the integrated database 142.

When the information processing device 100 receives a display request of a conversion dialog regarding the item value specified by the position on the matrix, the information processing device 100 displays the conversion dialog. Consequently, the manager can visually confirm how the item value of the file is converted.

When the positions that are associated with a specific item in the candidate items of the integrated database 142 and that are associated with two or more items of the file are specified, the information processing device 100 performs the following process. The information processing device 100 displays a conversion dialog in which the item values of the two or more items being specified are stored, in the input, and stores a value obtained by performing a conversion on the item values of the input, as the item value of the specific item of the integrated database 142. Consequently, the item values of the conversion source and the conversion destination can be easily confirmed.

As described in the rule 4, the information processing device 100 may generate records with the same key item, from the association between the item of the file and the key item of the integrated database 142, based on the map specified on the matrix. In this case, the information processing device 100 overwrites one record with another, based on a predetermined rule. Consequently, the records with the same key item can be prevented from being generated in the integrated database 142.

When the records with the same key item are generated, the information processing device 100 outputs an alert to the manager's terminal 30. Consequently, the manager can confirm whether the association between the item of the file and the candidate item of the integrated database 142 is appropriate.

As described in the rule 5, for the file that does not receive the specification of the key item, the information processing device 100 stores the item value in association with the item of the file including the key item, from the relation between the item of the file and the candidate item of the integrated database 142 that is specified by the link. Consequently, the item value that may lack in the integrated database 142 can be easily added.

The information processing device 100 associates the item of the file and the candidate item of the integrated database 142 by receiving the specification of a map on the matrix. Upon receiving a display request of a conversion dialog regarding the map, the information processing device 100 displays the conversion dialog. In this example, the information processing device 100 either applies a predetermined conversion rule that is set in advance, or receives the setting of the conversion rule, then converts the item value based on the received result, and stores the converted item value in the integrated database 142. Consequently, the conversion rule of the item values can be easily confirmed and changed.

When a record of a certain conversion is added or deleted, while the records of the conversions are being set, the information processing device 100 increments or decrements "*" in the "result of the conversion *" that is included in the record of the conversion. Consequently, even if the record of the conversion is added or deleted, the consistency of the conversion can be retained.

Figure 26:
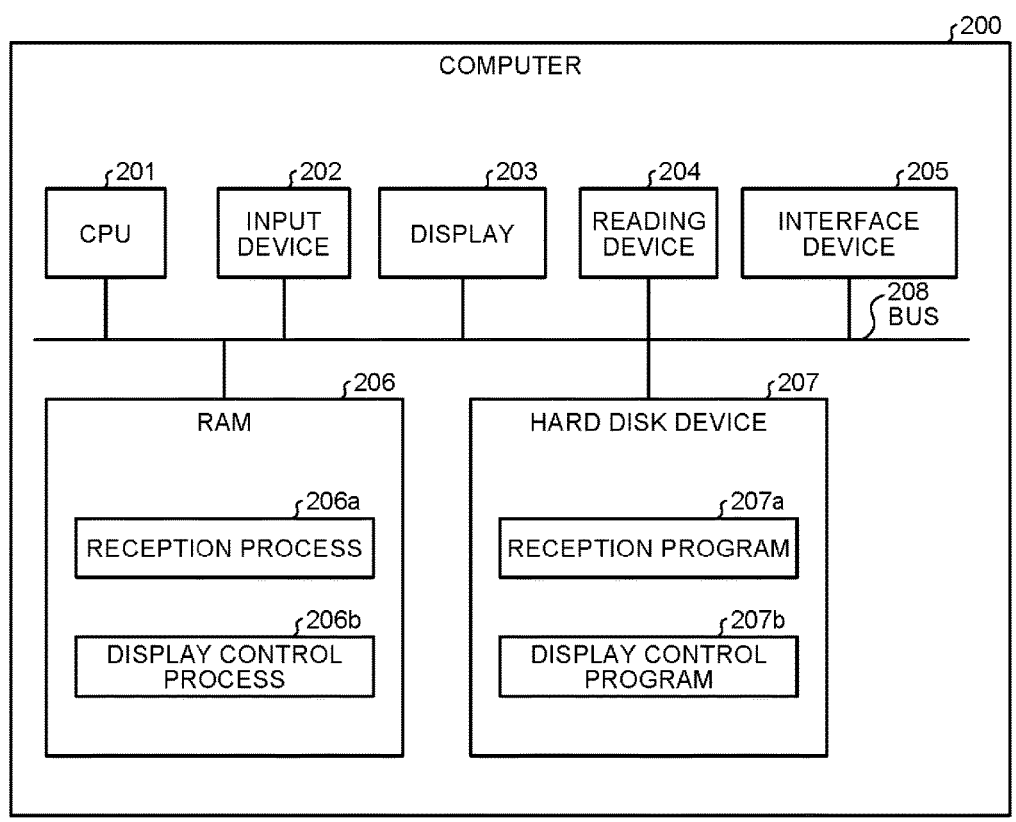
FIG. 26 is a diagram illustrating an example of a computer that executes a program for associating item values.

Next, an example of a computer that executes a program for associating item values that implements the same function as that of the information processing device 100 described in the above embodiment will be explained. FIG. 26 is a diagram illustrating an example of a computer that executes the program for associating item values.

As illustrated in FIG. 26, a computer 200 includes a CPU 201 that executes various arithmetic processes, an input device 202 that receives an input of data from a user, and a display 203. The computer 200 also includes a reading device 204 that reads out a computer program and the like from a recording medium, and an interface device 205 that transmits and receives data with another computer via a network. The computer 200 further includes a RAM 206 that temporarily stores therein various types of information, and a hard disk device 207. The devices 201 to 207 are connected to a bus 208.

The hard disk device 207 includes a reception program 207a and a display control program 207b. The CPU 201 reads out the reception program 207a and the display control program 207b, and develops the reception program 207a and the display control program 207b on the RAM 206.

The reception program 207a functions as a reception process 206a. The display control program 207b functions as a display control process 206b. The process of the reception process 206a corresponds to the process performed by the reception unit 151. The process of the display control process 206b corresponds to the process performed by the display control unit 152.

The reception program 207a and the display control program 207b need not be stored in the hard disk device 207 from the beginning. For example, the reception program 207a and the display control program 207b may be stored in a "portable physical medium" such as a flexible disk (FD), a compact disc read-only memory (CD-ROM), a digital versatile disc (DVD), a magneto-optical disc, an integrated circuit (IC) card, or the like that is to be inserted into the computer 200. The computer 200 may read out and execute the reception program 207a and the display control program 207b.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for associating item values that is executed by a computer, the method comprising:
receiving a plurality of data files, each of which includes a plurality of items and item values respectively associated therewith, wherein the plurality of data files include a first data file that includes a first item, a second item and a key item that is associated with a key item included in an integrated database, and include a second data file that does not include the key item, but include the first item and the second item;
displaying a matrix in which the items included in the first data file and the second data file received are arranged in either one of a row direction or a column direction of the matrix, and candidate items, with which a part or all of the items are associated, are arranged in the other direction;
receiving specification of a position on the matrix, the position indicating specification of a set of the first item of the first data file and a first candidate item in the candidate items, a set of the second item of the first data file and a second candidate item in the candidate items, or any item in the items of the first data file and any candidate item in the candidate items;

receiving specification of a link position on the matrix, the link position indicating specification of a set of the first item of the second data file and the first candidate item and specification of a position on the matrix, the position indicating specification of a set of the second item of the second data file and the second candidate item; and storing a value of an item among the items of the first data file, the item being indicated by the position specified, in the integrated database, in association with a candidate item among the candidate items, the candidate item being indicated by the position specified, wherein the storing includes storing in the storage integrated database a value of the second item of the second data file, instead of a value of the second item of the first data file, in association with the second candidate item, when a value of the first item of the first data file equals a value of the first item of the second data file.

2. The method for associating item values according to claim 1, wherein when the receiving includes receiving specification of positions on the matrix, the positions indicating specification of two or more specific items among the items and two or more candidate items among the candidate items, the storing includes storing in the integrated database values of the two or more specific items, in association with the two or more candidate items.

3. The method for associating item values according to claim 1, wherein the receiving includes receiving specification of a display of a conversion rule regarding a value of an item among the items that is specified by the position that is specified on the matrix, and the displaying includes displaying the conversion rule.

4. The method for associating item values according to claim 1, wherein when the receiving includes receiving specification of positions on the matrix, the positions indicating specification of one specific item among the candidate items and two or more items among the items, the displaying includes displaying a screen that receives a setting of a conversion rule to which values of the two or more items are entered; and the storing includes storing in the integrated database a value obtained by performing the conversion rule that is set on the values of the two or more items, in association with the specific item.

5. The method for associating item values according to claim 1, wherein when the receiving includes receiving specification of positions on the matrix, the positions indicating specification of two or more items among the items of the first data file or the second data file and one specific item among the candidate items, the storing includes storing in the integrated database a value obtained by connecting values of the two or more items in a predetermined order, in association with the specific item.

6. A non-transitory computer-readable recording medium having stored therein a program that causes a computer to execute a process comprising:

receiving a plurality of data files, each of which includes a plurality of items and item values respectively associated therewith, wherein the plurality of data files include a first data file that includes a first item, a second item and a key item that is associated with a key item included in an integrated database, and include a second data file that does not include the key item, but include the first item and the second item;

displaying a matrix in which the items included in the first data file and the second data file received are arranged in either one of a row direction or a column direction of the matrix, and candidate items, with which a part or all of the items are associated, are arranged in the other direction;

receiving specification of a position on the matrix, the position indicating specification of a set of the first item of the first data file and a first candidate item in the candidate items, a set of the second item of the first data file and a second candidate item in the candidate items, or any item in the items of the first data file and any candidate item in the candidate items;

receiving specification of a link position on the matrix, the link position indicating specification of a set of the first item of the second data file and the first candidate item and specification of a position on the matrix, the position indicating specification of a set of the second item of the second data file and the second candidate item; and storing a value of an item among the items of the first data file, the item being indicated by the position specified, in the integrated database, in association with a candidate item among the candidate items, the candidate item being indicated by the position specified, wherein the storing includes storing in the integrated database a value of the second item of the second data file, instead of a value of the second item of the first data file, in association with the second candidate item, when a value of the first item of the first data file equals a value of the first item of the second data file.

7. The recording medium according to claim 6, wherein when the receiving includes receiving specification of positions on the matrix, the positions indicating specification of two or more specific items among the items and two or more candidate items among the candidate items, the storing includes storing in the integrated database values of the two or more specific items, in association with the two or more candidate items.

8. The recording medium according to claim 6, wherein the receiving includes receiving specification of a display of a conversion rule regarding a value of an item among the items that is specified by the position that is specified on the matrix, and the displaying includes displaying the conversion rule.

9. The recording medium according to claim 6, wherein when the receiving includes receiving specification of positions on the matrix, the positions indicating specification of one specific item among the candidate items and two or more items among the items, the displaying includes displaying a screen that receives a setting of a conversion rule to which values of the two or more items are entered; and the storing includes storing in the integrated database a value obtained by performing the conversion rule that is set on the values of the two or more items, in association with the specific item.

10. The recording medium according to claim 6, wherein when the receiving includes receiving specification of positions on the matrix, the positions indicating specification of two or more items among the items of the first data file or the second data file and one specific item among the candidate items, the storing includes storing in the integrated database a value obtained by connecting values of the two or more items in a predetermined order, in association with the specific item.

11. An information processing device, comprising:
a processor that executes a process comprising:
receiving a plurality of data files, each of which includes a plurality of items and item values respectively associated therewith, wherein the plurality of data files include a first data file that includes a first item, a second item and a key item that is associated with a key item included in an integrated database, and include a second data file that does not include the key item, but include the first item and the second item;
displaying a matrix in which the items included in the first data file and the second data file received are arranged in either one of a row direction or a column direction of the matrix, and candidate items, with which a part or all of the items are associated, are arranged in the other direction;
receiving specification of a position on the matrix, the position indicating specification of a set of the first item of the first data file and a first candidate item in the candidate items, a set of the second item of the first data file and a second candidate item in the candidate items, or any item in the items of the first data file and any candidate item in the candidate items;
receiving specification of a link position on the matrix, the link position indicating specification of a set of the first item of the second data file and the first candidate item and specification of a position on the matrix, the position indicating specification of a set of the second item of the second data file and the second candidate item; and
storing a value of an item among the items of the first data file, the item being indicated by the position specified, in the integrated database, in association with a candidate item among the candidate items, the candidate item being indicated by the position specified,
wherein the storing includes storing in the integrated database a value of the second item of the second data file, instead of a value of the second item of the first data file, in association with the second candidate item, when a value of the first item of the first data file equals a value of the first item of the second data file.

12. The information processing device according to claim 11, wherein when the receiving includes receiving specification of positions on the matrix, the positions indicating specification of two or more specific items among the items and two or more candidate items among the candidate items, the information processing device stores in the integrated database values of the two or more specific items, in association with the two or more candidate items.

13. The information processing device according to claim 11, wherein the information processing device receives specification a display of a conversion rule regarding a value of an item among the items that is specified by the position that is specified on the matrix, and the displaying includes displaying the conversion rule.

14. The information processing device according to claim 11, wherein when the receiving includes receiving specification of positions on the matrix, the positions indicating specification of one specific item among the candidate items and two or more items among the items, the information processing device
displays a screen that receives a setting of a conversion rule to which values of the two or more items are entered; and
stores in the integrated database a value obtained by performing the conversion rule that is set on the values of the two or more items in association with the specific item.

15. The information processing device according to claim 11, wherein when the receiving includes receiving specification of positions on the matrix, the positions indicating specification of two or more items among the items of the first data file or the second data file and one specific item among the candidate items, the storing includes storing in the integrated database a value obtained by connecting values of the two or more items in a predetermined order, in association with the specific item.

* * * * *